US011501098B2

(12) United States Patent
Yamamoto et al.

(10) Patent No.: US 11,501,098 B2
(45) Date of Patent: Nov. 15, 2022

(54) INFORMATION CODE READER

(71) Applicant: DENSO WAVE INCORPORATED, Aichi-Pref. (JP)

(72) Inventors: Kenryo Yamamoto, Chita-gun (JP); Koji Konosu, Chita-gun (JP); Kazumi Kambe, Chita-gun (JP); Kentarou Maruyama, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 0 days.

(21) Appl. No.: 17/288,482

(22) PCT Filed: Oct. 21, 2019

(86) PCT No.: PCT/JP2019/041389
§ 371 (c)(1),
(2) Date: Apr. 23, 2021

(87) PCT Pub. No.: WO2020/085331
PCT Pub. Date: Apr. 30, 2020

(65) Prior Publication Data
US 2021/0390276 A1 Dec. 16, 2021

(30) Foreign Application Priority Data

Oct. 23, 2018 (JP) .............................. JP2018-198918
Mar. 19, 2019 (JP) .............................. JP2019-050634
Sep. 10, 2019 (JP) .............................. JP2019-164650

(51) Int. Cl.
G06K 7/14 (2006.01)
(52) U.S. Cl.
CPC ......... G06K 7/1417 (2013.01); G06K 7/1413 (2013.01)

(58) Field of Classification Search
CPC .. G06K 7/1404; G06K 7/1408; G06K 7/1413; G06K 7/1417
See application file for complete search history.

(56) References Cited

U.S. PATENT DOCUMENTS

2007/0084932 A1    4/2007  Shinozaki
2021/0192153 A1*   6/2021  Kunieda ................. G07D 7/12

FOREIGN PATENT DOCUMENTS

CA       2375577 A1    9/2003
CN     107111737 A     8/2017
(Continued)

OTHER PUBLICATIONS

Dec. 24, 2019 International Search Report issued in International Patent Application No. PCT/JP2019/041389.

Primary Examiner — Laura A Gudorf
(74) Attorney, Agent, or Firm — Oliff PLC

(57) ABSTRACT

An information code reader is capable of readably imaging an information code displayed on a screen, not liming to an information code covered by a covering portion through which visible light cannot be transmitted. In an information code reader, first illumination units to radiate visible light, in which an information code is subjected to image acquisition by a first image acquisition unit. Second illumination units radiate infrared light, in which the information code is subjected to image acquisition by a second image acquisition unit. A visible light cut filter, which does not allow the visible light to pass through, but which allows the infrared light pass through, is arranged depending on a spatial imaging range provided by the second image acquisition unit.

18 Claims, 29 Drawing Sheets

(56) References Cited

FOREIGN PATENT DOCUMENTS

| | | | | | |
|---|---|---|---|---|---|
| JP | 2008-090733 | A | | 4/2008 | |
| JP | 2012-133743 | A | | 7/2012 | |
| JP | 2015-172930 | A | | 10/2015 | |
| JP | 2017117455 | A | * | 6/2017 | ........... G06K 7/1447 |
| JP | 2017-194788 | A | | 10/2017 | |
| TW | M551717 | U | | 11/2017 | |

* cited by examiner

FIG.6
(A)
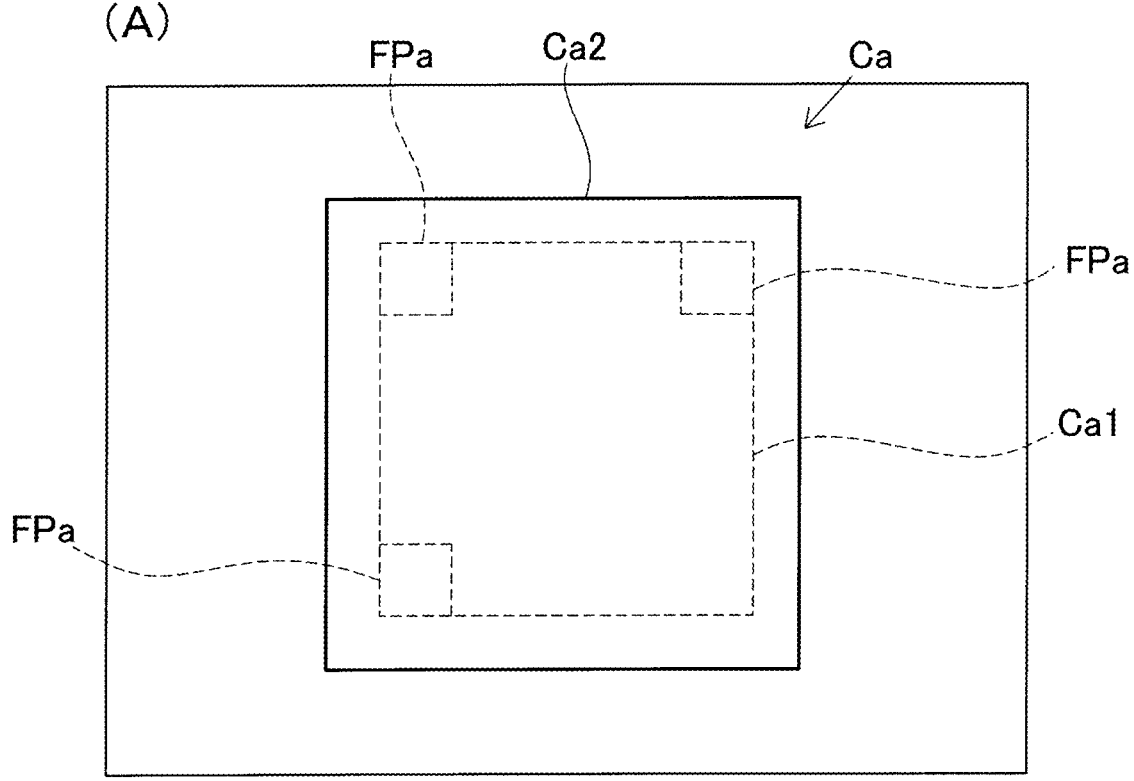
(B)
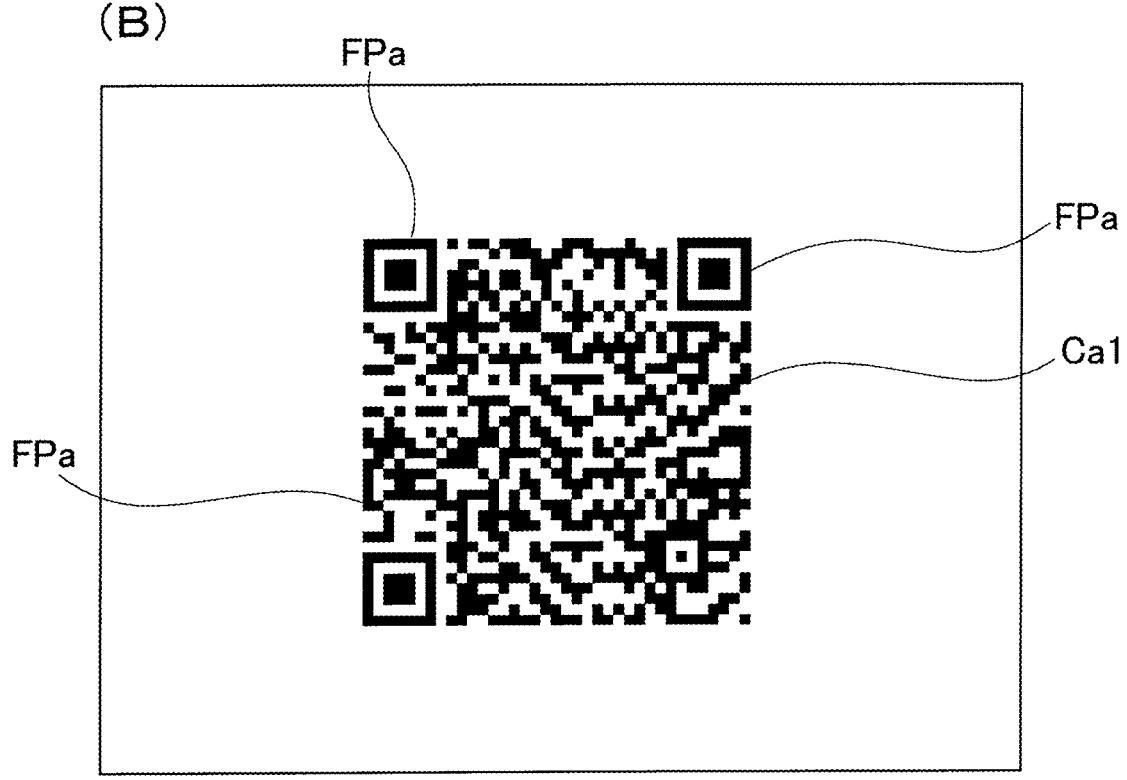

FIG.7
(A)
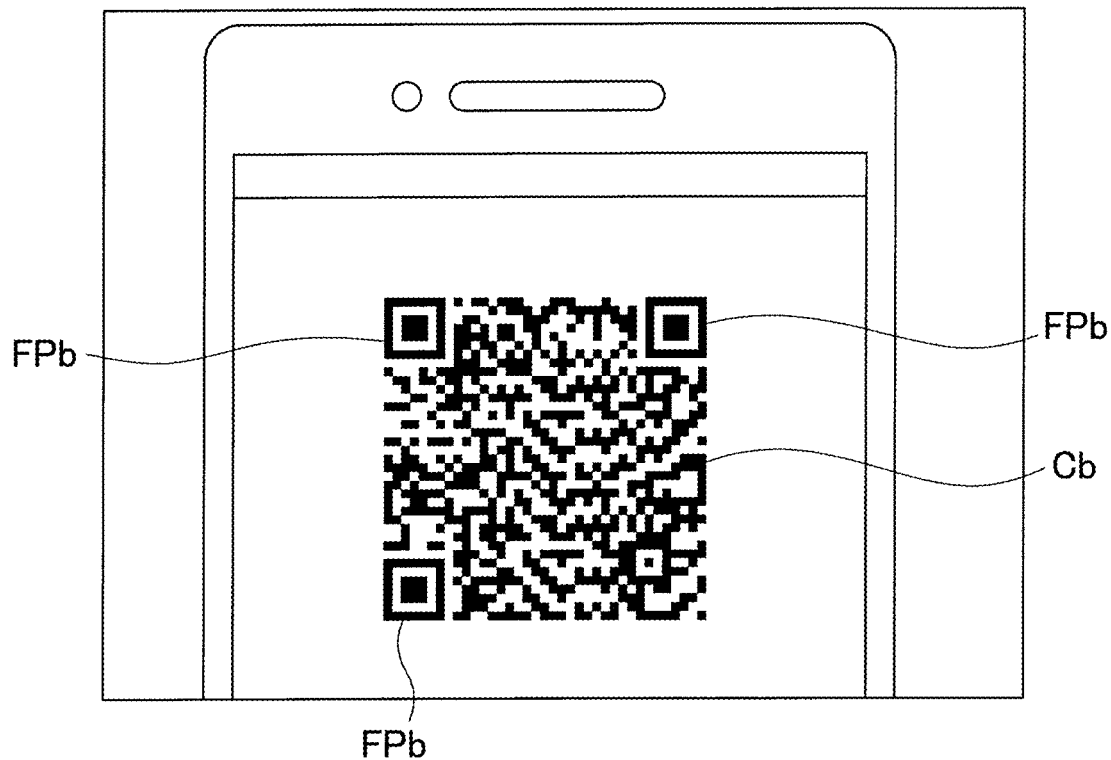
(B)
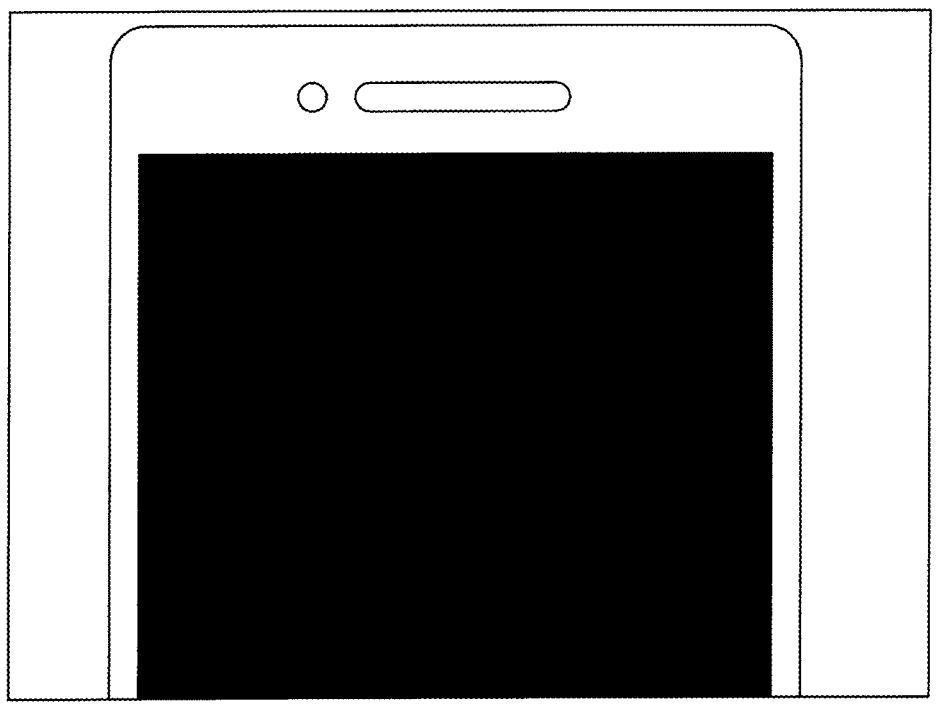

FIG.10
(A)
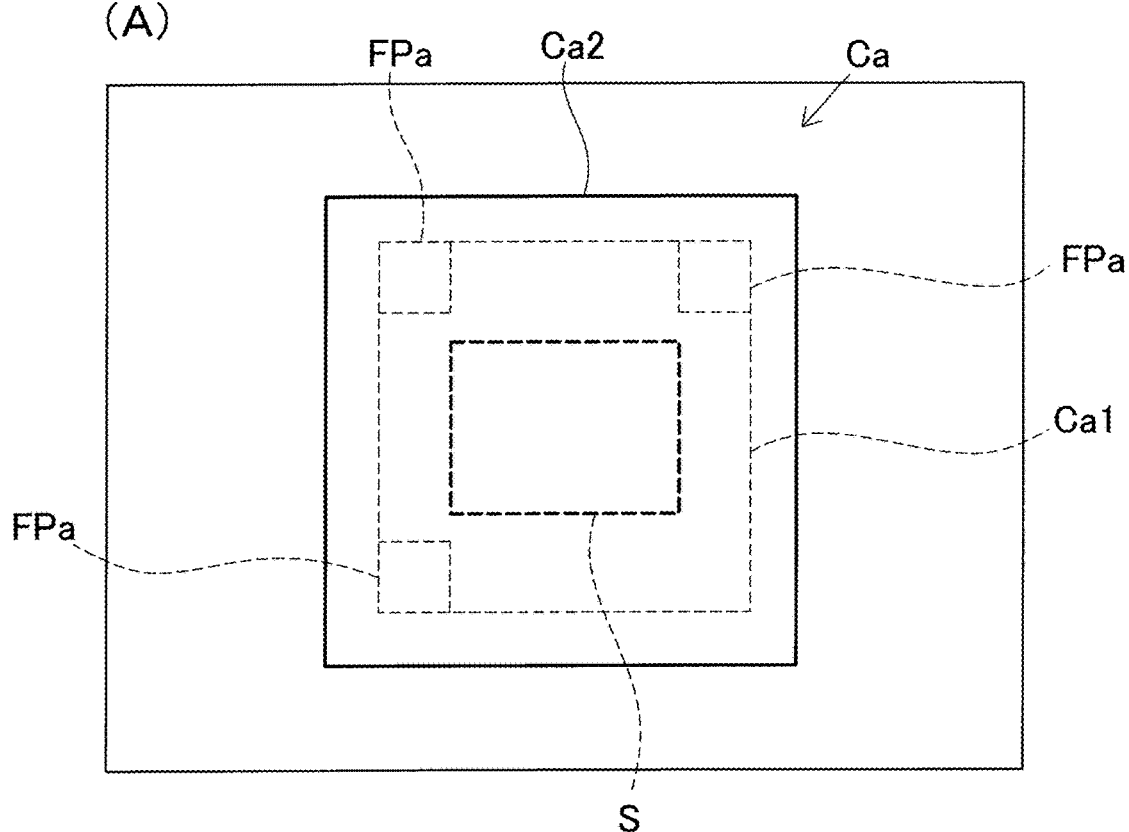
(B)
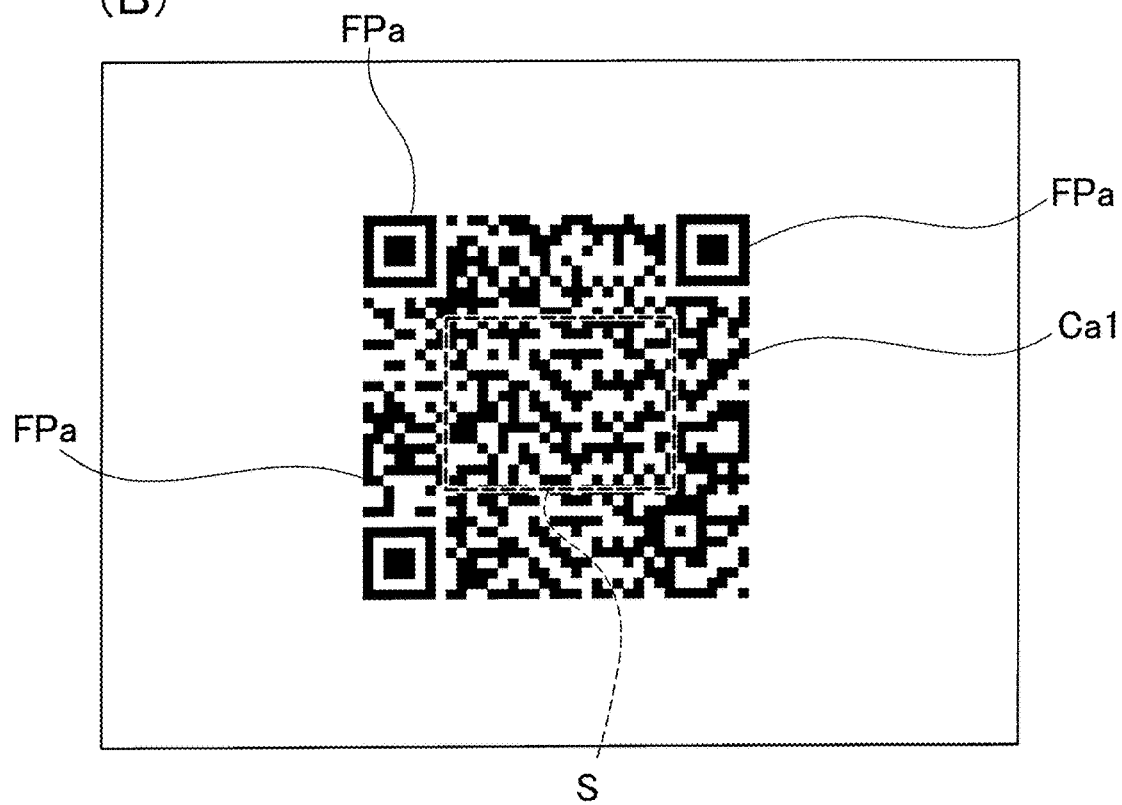

FIG.11
(A)
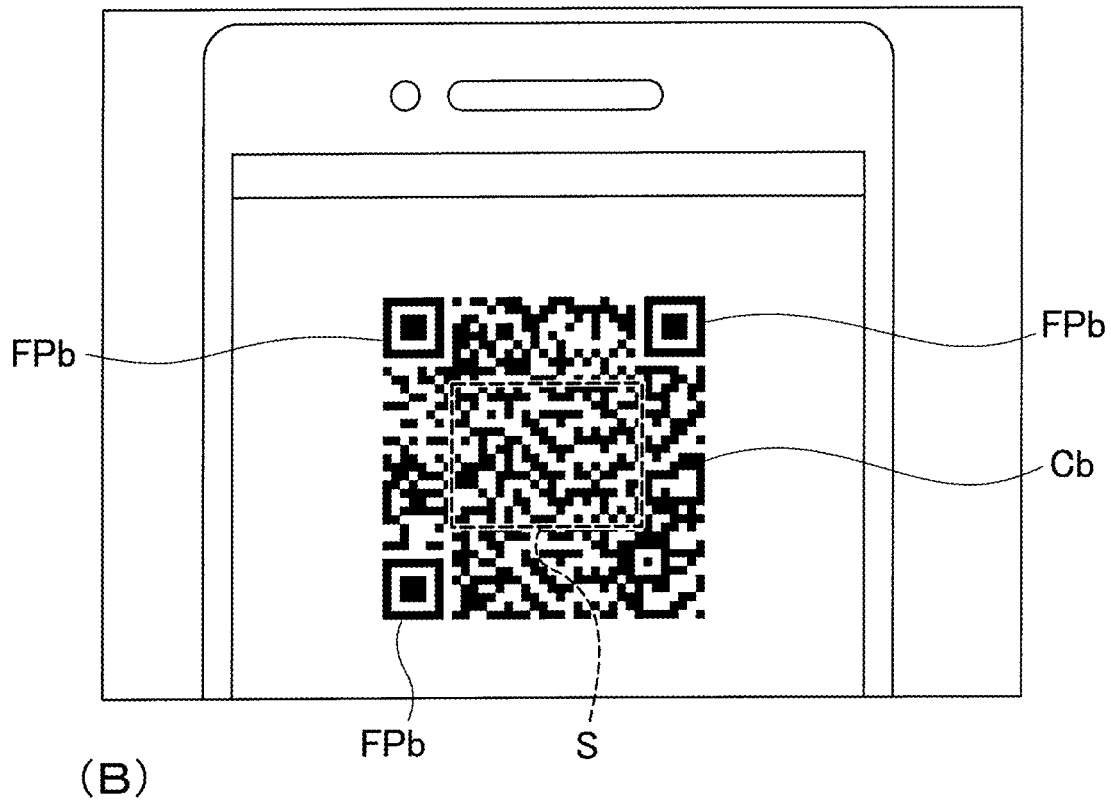
(B)
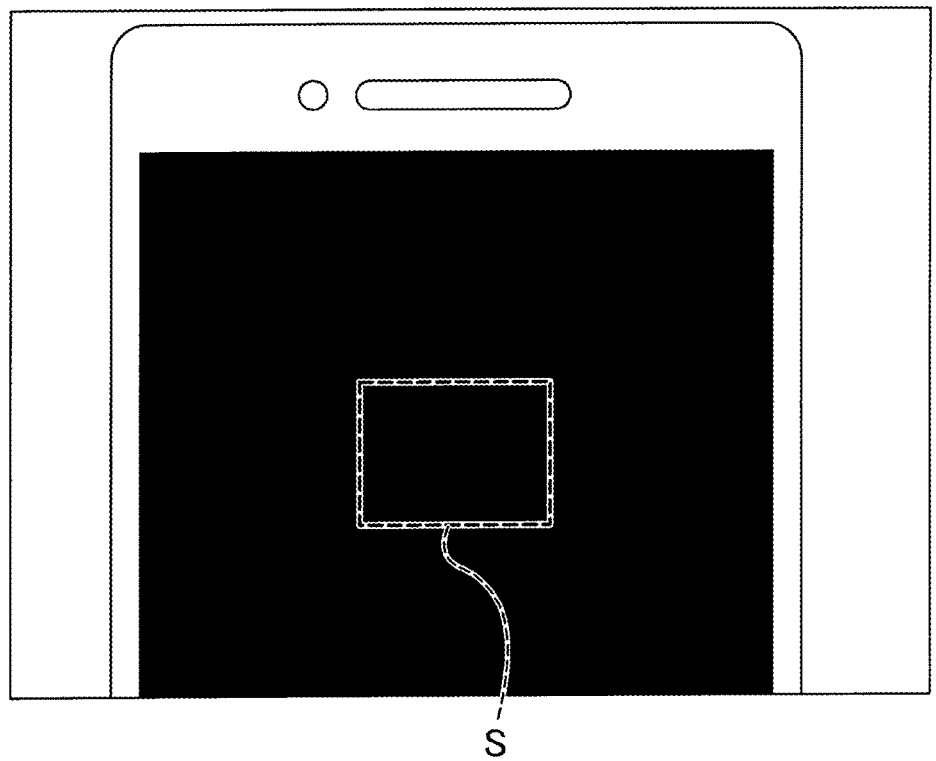

FIG.21
(A) FIRST SIDE SURFACE
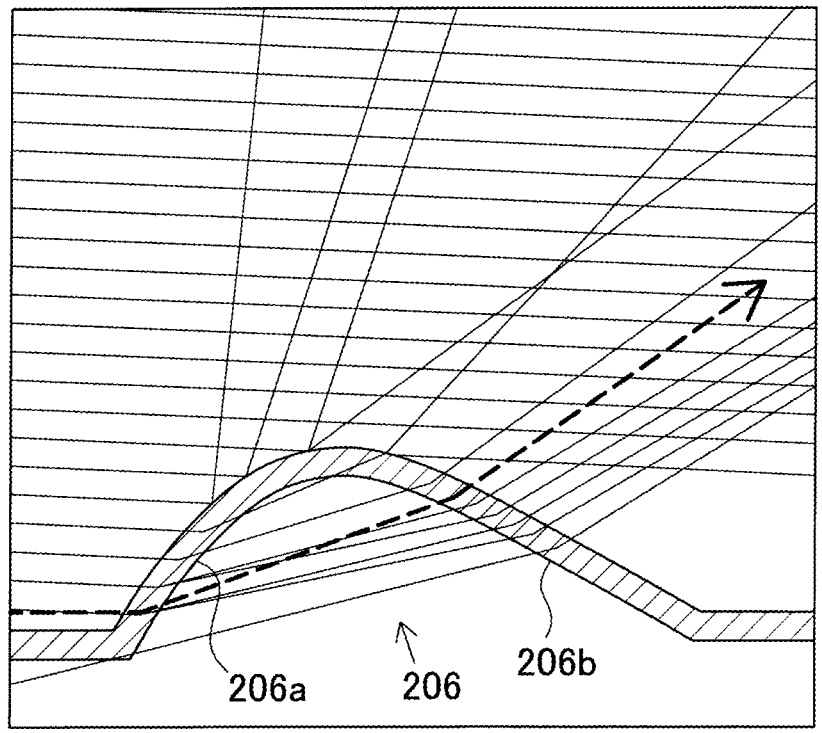
(B) SECOND SIDE SURFACE
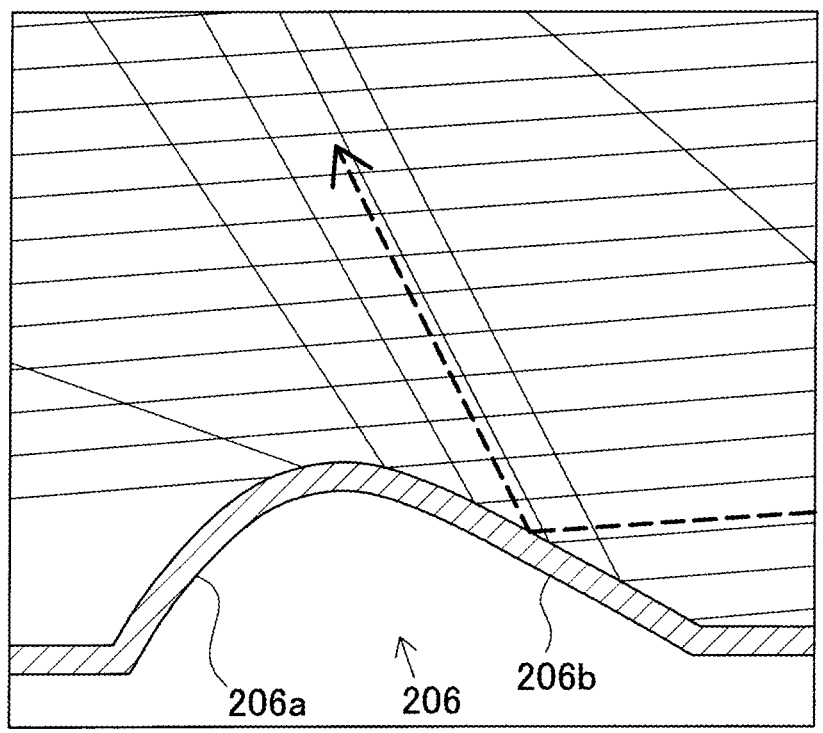

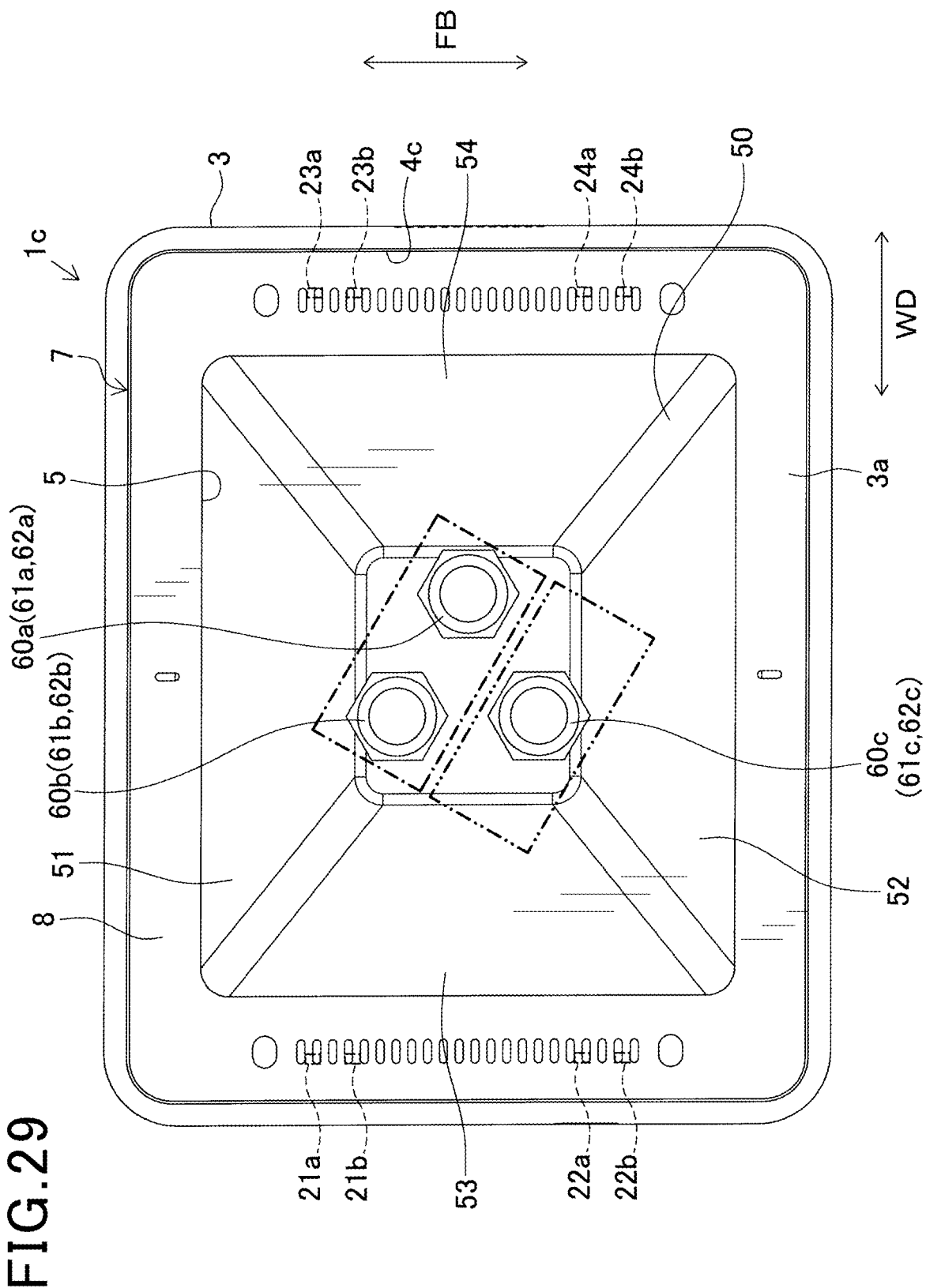

INFORMATION CODE READER

CROSS-REFERENCE TO RELATED APPLICATION

This application is based on and claims the benefit of priority from earlier Japanese Patent Application No. 2018-198918 filed on Oct. 23, 2018 the description of which is incorporated herein by reference.

BACKGROUND

Technical Field

The present invention relates to an information code reader, and more particularly, to an information code reader for reading an information code in which encoded information is written, such as a one-dimensional code or a two-dimensional code.

Background Art

In recent years, security has been required for information codes, which is required as a technique for a reader that optically reads such an information code with enhanced security. For example, there is known an information code reader disclosed in Patent Literature 1 below.

The information code to be read by this information code reader in each module arranged in the code area is printed with dark color modules when it is radiated (emitted) with visible light (light in the first wavelength band) or infrared light (light in the second wavelength band) to show the reflection characteristics of dark colors. On the other hand, bright color modules are printed so as to show a dark color reflection characteristic when radiated with visible light and a light color reflection characteristic when radiated with infrared light. Therefore, the information code reader is provided with a first illumination light source that radiates visible light, a second illumination light source that radiates infrared light, and an image acquisition unit that captures an information code while being radiated with either light, and the information code reader is configured to extract and decode the information code from the acquired image of the information code captured by the image acquisition unit. That is, the information code can be decoded based on the image data captured in a state where the information code to be read is radiated with infrared light. On the other hand, in a normal environment where visible light is radiated dominantly, the entire code area becomes dark, and the security of the information code is enhanced by utilizing the fact that not only the information code cannot be imaged but also the information code itself cannot be visually recognized.

CITATION LIST

Patent Literature

[PTL 1] JP 2012-133743 A

By the way, the security of the information code can be enhanced by covering at least a part of the code region with a covering portion that transmits light in the second wavelength band such as infrared light without transmitting visible light. When such an information code is imaged and decoded, the imaged information code may fail to be decoded due to the influence of the surrounding environment and the like. That is, an environment in which the surrounding visible light is too bright for the light in the second wavelength band emitted from the reader, for example, in an outdoor environment exposed to sunlight, this is because even if the light in the second wavelength band is radiated, the reflected light from the coating portion is imaged because the visible light is excessively radiated, and the code region covered by the coating portion cannot be imaged decipherably.

In order to solve this problem, it is conceivable to provide a filter that transmits light in the second wavelength band without transmitting visible light to the image acquisition unit. Since the visible light reflected by the covering portion is removed by this filter, it is possible to image the light of the second wavelength band reflected according to the code region.

However, an image acquisition unit that employs such a filter has another problem in that it cannot image a normal information code displayed on a liquid crystal screen or the like. This is because in the image acquisition unit that employs the foregoing filter, even if the liquid crystal screen displays an information code or the like, the screen portion is imaged in a pitch-black state since the LCD screen uses visible light to display the information code.

SUMMARY

Thus it is desired to provide an information code reader capable of readably capturing not only an information code covered with a covering portion that cannot transmit visible light but also an information code displayed on a screen.

In order to achieve the above object, the information code reader according to the first aspect is characterized by including the following; a first illumination unit capable of radiating visible light, a second illumination unit capable of radiating light in a predetermined second wavelength band different from the visible light wavelength band, the first image acquisition unit that captures an information code in a state where the visible light is radiated by the first illumination unit, a second image acquisition unit that captures an information code while the second illumination unit radiates light in the second wavelength band, a filter that is arranged according to the imaging range of the second image acquisition unit and transmits light in the second wavelength band without transmitting visible light, a processing unit (31) that performs a process of decoding an information code based on at least one of a first image captured by the first image acquisition unit and a second image captured by the second image acquisition unit.

The reference numerals in the parentheses indicate the correspondence with the specific means described in the embodiments described later.

In the information code reader according to the first aspect, the information code is imaged by the first image acquisition unit while the visible light is radiated by the first illumination unit, and the information code is imaged by the second image acquisition unit in a state where the light in the second wavelength band is radiated by the second illumination unit. Further, a filter that transmits light in the second wavelength band without transmitting visible light is arranged according to the imaging range of the second image acquisition unit.

As a result, if the reading target is an information code whose code region is covered with a covering portion that transmits light in the second wavelength band such as infrared light without transmitting visible light, the information code can be decoded based on the second acquired image captured by the second image acquisition unit since the reflected light from the code region due to the radiation of the light in the second wavelength band passes through the covering portion. In particular, in the imaging range of the second image acquisition unit, a filter that transmits light in the second wavelength band without transmitting visible light is arranged, so the reflected light from the covering portion is not captured even in an outdoor environment where the surrounding visible light is too bright. On the other hand, if the reading target is a normal information code displayed on a liquid crystal screen or the like, the information code can be decoded based on the first acquired image captured by the first image acquisition unit. Therefore, not only the information code covered with the covering portion that cannot transmit visible light but also the information code displayed on the screen can be imaged in a readable manner.

In the information code reader according to the second aspect, the illumination control unit controls the first illumination unit so as to radiate visible light at the time of imaging by the first image acquisition unit, and the second illumination unit is controlled so as to radiate light in the second wavelength band at the time of imaging by the second image acquisition unit.

As a result, when the first image acquisition unit and the second image acquisition unit perform imaging at the same time, visible light and light in the second wavelength band can be simultaneously radiated. When imaging is performed at different timings, the radiation timings of the visible light and the light in the second wavelength band can be shifted according to the timings.

In the information code reader according to the third aspect, either one of the first acquired image and the second acquired image is set by the setting unit as a decoding target by the processing unit based on the result of analysis processing for at least a part of the first acquired image and the second acquired image. Then, the processing unit performs a process of decoding the information code based on the acquired image set as the decoding target by the setting unit.

As a result, the easily decipherable acquired image of the first acquired image and the second acquired image can be set as the decoding target by the processing unit, so the processing load related to the decoding process can be reduced compared with the case where each of the two acquired images is subjected to the decoding process.

In the information code reader according to the fourth aspect, processing is performed to extract a specific pattern in the code region from each of the first acquired image and the second acquired image, and a large number of acquired images from which the specific pattern is extracted are set as decoding targets by the processing unit.

If it is a decipherable acquired image, it may be imaged so as to include all specific patterns, and if it is an undecipherable or difficult-to-decipherable acquired image, it may be imaged so as not to include all specific patterns. Therefore, by setting the decoding target according to the number of extracted specific patterns, the decoding target can be easily set, so that the processing load related to the decoding process can be further reduced.

In the information code reader according to the fifth aspect, binarized for a specific area in each of the first acquired image and the second acquired image, and processing is performed to count the number of changes in black and white that change along one or two or more scanning lines in the specific area, and the acquired image having a large number of changes is set as a decoding target by the processing unit.

By setting a part of the range where the information code is easily captured in the acquired image as the specific area, the number of changes in black and white along each scanning line increases in the specific area since a plurality of arranged light-colored cells and dark-colored cells are included in the specific area in the case of a acquired image in which the information code is decipherably captured. On the other hand, if the number of changes in black and white along each scanning line is small in the specific area, the information code may not be imaged decipherably, and the information code may be imaged undecipherably or difficult to decipher. Therefore, by setting the decoding target according to the number of changes in black and white in a specific area, the processing load related to the decoding process can be further reduced since the decoding target can be easily set.

In the information code reader according to the sixth aspect, another filter that transmits visible light without transmitting light in the second wavelength band is arranged according to the imaging range of the first image acquisition unit. As a result, when the information code is imaged by the first image acquisition unit in the state of being radiated with visible light, even if the light in the second wavelength band is radiated by the second illumination unit, the reflected light caused by the radiation of the light in the second wavelength band is not captured by the first image acquisition unit. Therefore, the information code can be imaged more clearly by eliminating the influence of the radiation of light in the second wavelength band.

In the information code reader according to the seventh aspect, the first image acquisition unit and the second image acquisition unit are arranged in a case where a reading surface is provided, and the information code held on or over the reading surface can be imaged in a state where the center of the field of view of the first image acquisition unit and the center of the field of view of the second image acquisition unit are arranged so as to mutually cross at the center of the reading surface.

By simply arranging the first image acquisition unit and the second image acquisition unit side by side in the case, when the center of each field of view is orthogonal to the reading surface, the imaging range on the reading surface differs between the first image acquisition unit and the second image acquisition unit, so the position of the reading surface suitable for holding the information code covered with the covering portion and the position of the reading surface suitable for holding the information code displayed on the screen are different. Therefore, by arranging the first image acquisition unit and the second image acquisition unit so that their respective field-of-view centers intersect at the center of the reading surface on which the information code is easily held, the position of the reading surface suitable for holding the information code covered with the covering portion and the position of the reading surface suitable for holding the information code displayed on the screen can be matched at the center of the reading surface.

Further, in the information code reader according to the eighth aspect, a case in which at least the first lighting unit, the second lighting unit, the first image acquisition unit, the second image acquisition unit, and the filter are housed, and a reading surface over which the information code is held is provided, and a reflective member housed in the case and reflecting the visible light emitted from the first illumination unit and the light in the second wavelength band emitted from the second illumination unit toward the reading surface, is required.

The information code reader according to the ninth aspect is provided with a reflective member that reflects visible light emitted from the first illumination unit and light in the second wavelength band emitted from the second illumination unit toward the reading surface. Then, of the imaging range of the first imaging unit, the range formed between the first imaging unit and the reading surface provided in the first imaging unit and the range formed between the reading surface and the reflecting member is defined as the first post-reflection imaging range so as to follow the first pre-reflection imaging range when reflected inside the case on the reading surface. Of the imaging range of the second imaging unit, the range formed between the second imaging unit and the reading surface provided in the second imaging unit is the second pre-reflection imaging range, and the range formed between the reading surface and the reflecting member so as to follow the second pre-reflection imaging range when reflected inside the case on the reading surface is defined as the second post-reflection imaging range. At this time, the reflective member is arranged at a position outside the first pre-reflection imaging range and outside the second pre-reflection imaging range, and the first illumination unit, the second illumination unit, the first image acquisition unit, the second image acquisition unit, and the filter are arranged at positions outside the image acquisition range after the first reflection and outside the image acquisition range after the second reflection. Then, the first illumination unit radiates visible light toward a first reflection surface of the reflection member, which provides a corresponding imaging range after the first reflection. The second illumination unit radiates light in the second wavelength band toward a second reflection surface of the reflection member, which provides a corresponding imaging range after the second reflection.

As a result, when imaging the information code held over the reading surface, even if the inside of the case is reflected in the acquired image rather than the reading surface due to reflection by the display surface on which the information code is displayed, the entire first reflective surface of the reflective member radiated with visible light and the entire second reflective surface of the reflective member radiated with light in the second wavelength band can be easily imaged. Therefore, as compared with the case where the first illumination unit and the second illumination unit are directly imaged, the illumination light (visible light or light in the second wavelength band) becomes inconspicuous, and the generation of noise light due to the illumination light can be suppressed while ensuring the required illuminance in the acquired image. Therefore, even when the first illumination unit and the second illumination unit are housed in the case, it is possible to suppress the influence of noise light due to the reflection of the illumination light on the acquired image. Hereinafter, further exemplary configurations are provided for the various aspects described above. The characteristics of these configurations will be clarified by the various embodiments described below that will be described with the accompanying drawings.

BRIEF DESCRIPTION OF DRAWINGS

In the accompanying drawings:

In FIG. 6, a part (A) is an explanatory diagram for explaining a first acquired image in which the information code Ca is imaged, and a part (B) is an explanatory diagram illustrating a second acquired image obtained by capturing the information code Ca.

In FIG. 7, a part (A) is an explanatory diagram for explaining the first acquired image obtained by capturing the screen-displayed information code Cb, and a part (B) is an explanatory diagram illustrating a second acquired image obtained by capturing the information code Cb displayed on the screen.

In FIG. 10, a part (A) is an explanatory diagram illustrating a specific area of the first acquired image in which the information code Ca is captured, and a part (B) is an explanatory diagram illustrating a specific area of the second acquired image obtained by capturing the information code Ca.

In FIG. 11, a part (A) is an explanatory diagram illustrating a specific area of the first acquired image obtained by capturing the screen-displayed information code Cb, and a part (B) is an explanatory diagram illustrating a specific area of the second acquired image obtained by capturing the information code Cb displayed on the screen.

FIG. 29 is a plan view of an information code reader according to a second modification of the eighth embodiment.

DESCRIPTION OF THE EMBODIMENTS

First Embodiment

Hereinafter, the first embodiment embodying the information code reader of the present disclosure will be described with reference to the drawings.

<Overall configuration code reader>

Figure 1:
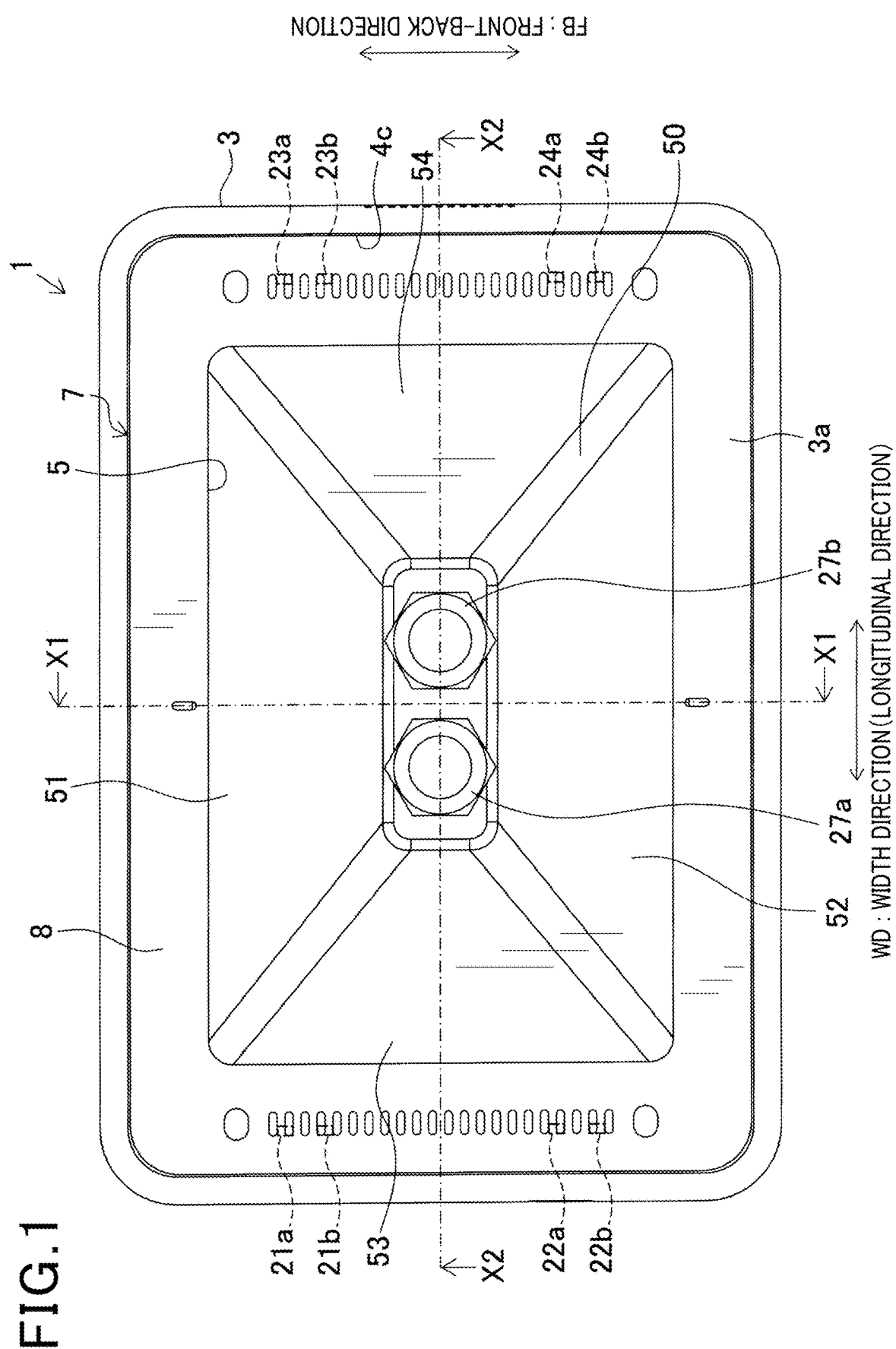
FIG. 1 is a plan view of an information code reader according to a first embodiment.
Figure 2:
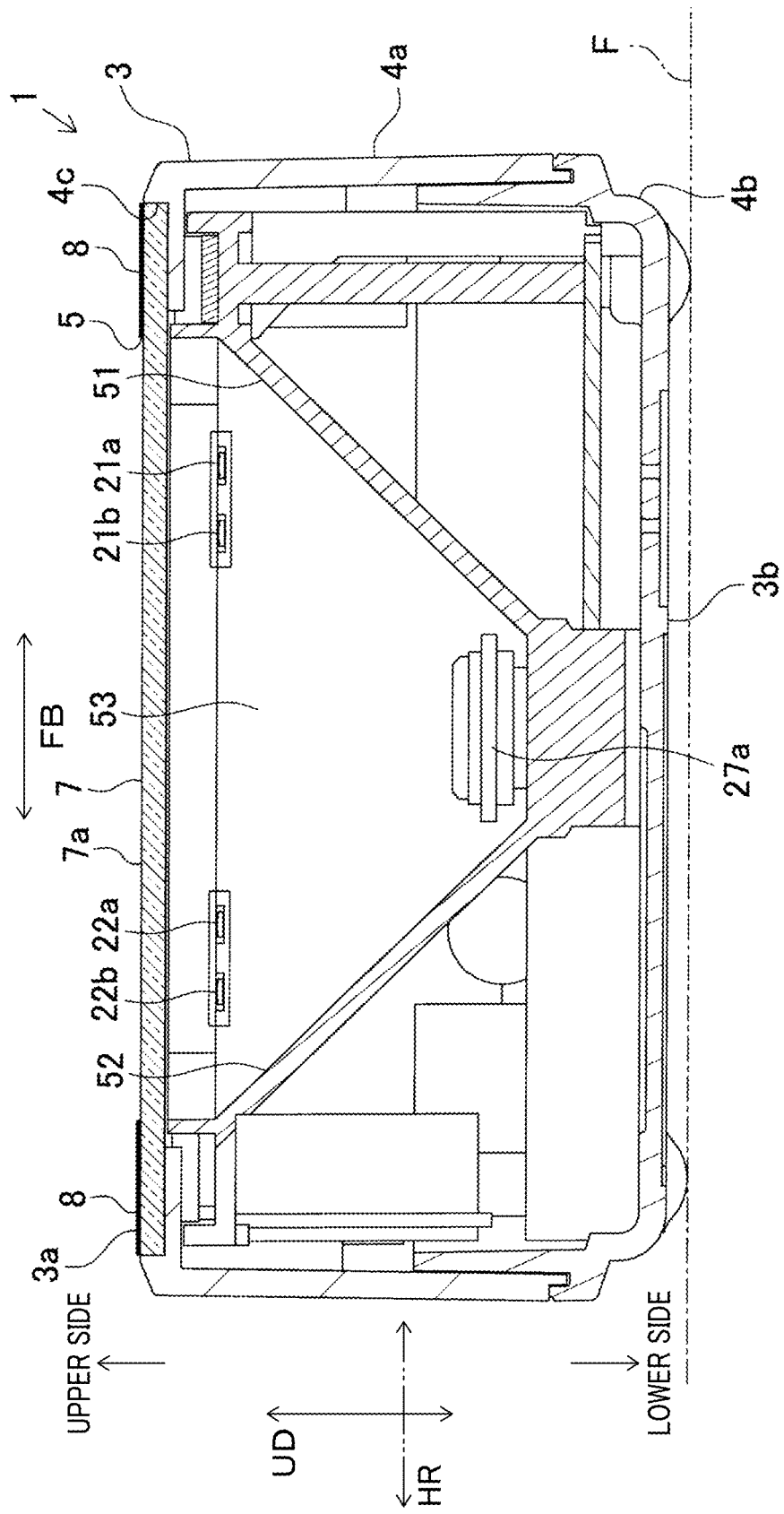
FIG. 2 is a schematic cross-sectional view schematically showing a cross section of X1-X1 of FIG. 1
Figure 3:
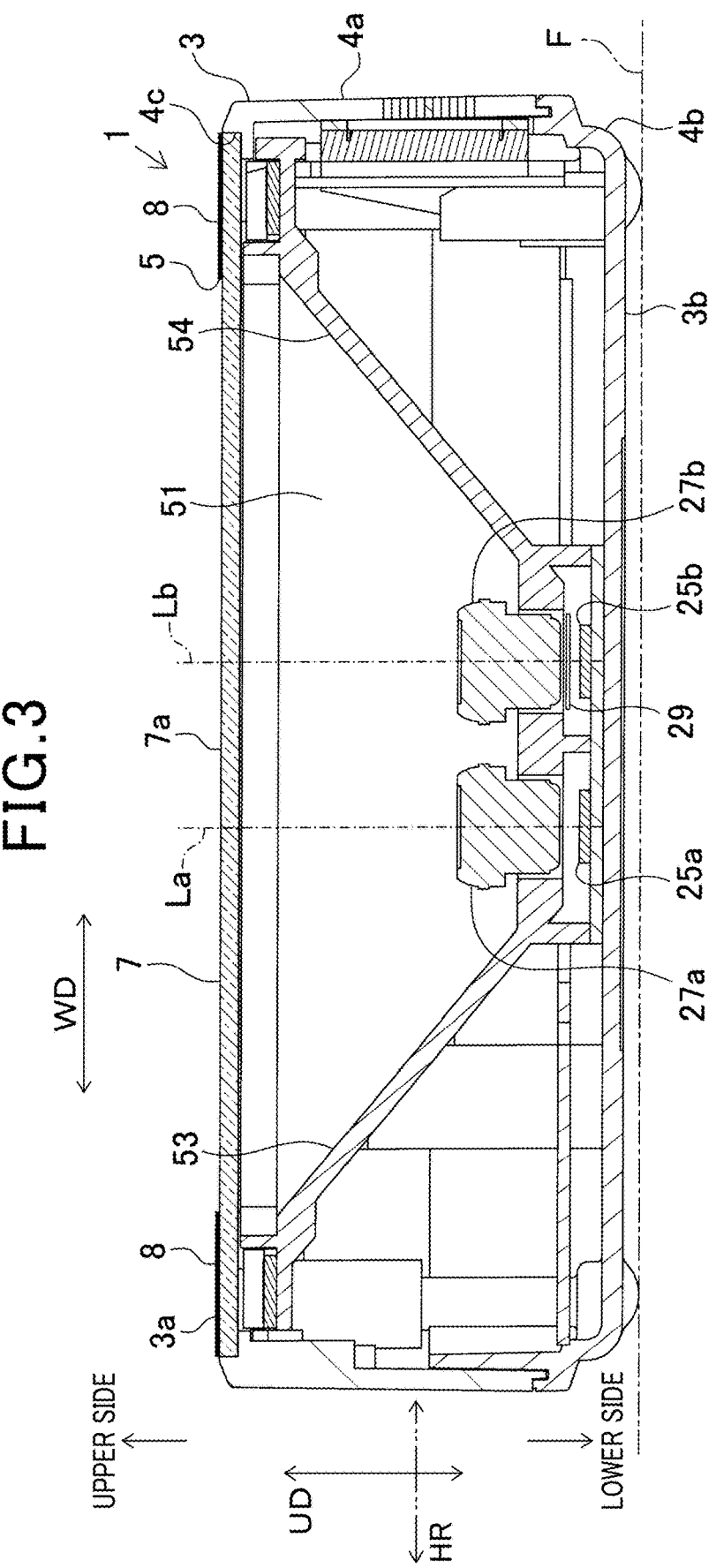
FIG. 3 is a schematic cross-sectional view schematically showing a cross section of X2-X2 of FIG. 1

The information code reader 1 shown in FIGS. 1 to 3 and the like is configured as a stationary reading device mounted on the mounting surface with the upper surface of a desk, a shelf, or the like as the mounting surface (see the mounting surface F in FIGS. 2 and 3), and It has a function as an information code reader that reads information codes such as one-dimensional codes such as barcodes and two-dimensional codes such as QR codes (registered trademark).

The information code reader 1 includes a case 3 made of a resin material such as ABS resin. As shown in FIGS. 2 and 3, the case 3 includes an upper case 4a and a lower case 4b, has a rectangular shape having a longitudinal direction in a plan view, and is configured as a box shape as a whole. Inside the case 3, each component such as an imaging unit, an image acquisition unit, and a light guide member, which will be described later, is housed. Further, in the case 3, an optical reading port 5 serving as an entrance/exit of light is formed on an upper surface portion (reading side wall portion 3a) provided on one side of a predetermined vertical direction UD via a translucent plate 7 described later. Light from the outside of the case 3 enters the inside of the case 3 through the reading port 5, and the light from the inside of the case 3 is emitted to the outside of the case 3. The optical system composed of the imaging unit and the image acquisition unit functions to image an information code or the like arranged outside the case 3 through the reading port 5.

In the box-shaped case 3, the bottom wall portion 3b provided on the mounting surface side when the information code reader 1 is mounted and the reading side wall portion 3a on which the reading port 5 is formed are provided so as to face each other. The bottom wall portion 3b is arranged so as to face the mounting surface F side, face the mounting surface F, and be supported by the mounting surface F. The reading side wall portion 3a facing the bottom wall portion 3b is configured as an exposed wall portion on the side holding the information code or the like. In this configuration, the direction in which the bottom wall portion 3b and the reading side wall portion 3a face each other (that is, the thickness direction of the case 3 and the direction orthogonal to the mounting surface F shown in FIG. 2) is the vertical direction UD (see FIGS. 2 and 3), and the side on which the reading port 5 is formed (reading side wall portion 3a side) is the upper side, and the opposite side (bottom wall portion 3b side) is the lower side. Further, the direction along the virtual two-dimensional plane orthogonal to the vertical direction UD is defined as the horizontal plane direction HR (see FIGS. 2 and 3).

As shown in FIGS. 2 and 3, etc., on the upper surface side of the case 3, a plate 7 is arranged so as to close the opening 4c formed at the upper end of the upper case 4a so as to close the case 3, and at least a part of the plate 7 is arranged in the imaging range. The plate 7 is configured as a flat plate having a predetermined thickness, and is composed of a light-transmitting member (for example, transparent acrylic resin, transparent glass, etc.) that allows light from the outside of the case 3 to pass through. This plate 7 functions as a dustproof plate and serves as a dustproof plate, and foreign matter (dust, dust, etc.) from the outside of the case is less likely to enter the inside of the case 3 by closing the opening 4c formed in the upper case 4a by such a plate 7. Further, a coating layer 8 made of a light-shielding paint or the like is formed so as to partially cover the upper surface portion of the plate 7. The coating layer 8 is formed in an annular shape along the peripheral edge of the plate 7, and the opening formed by the inner edge of the coating layer 8 is the reading port 5.

Next, the electrical configuration of the information code reader 1 will be described.

Figure 4:
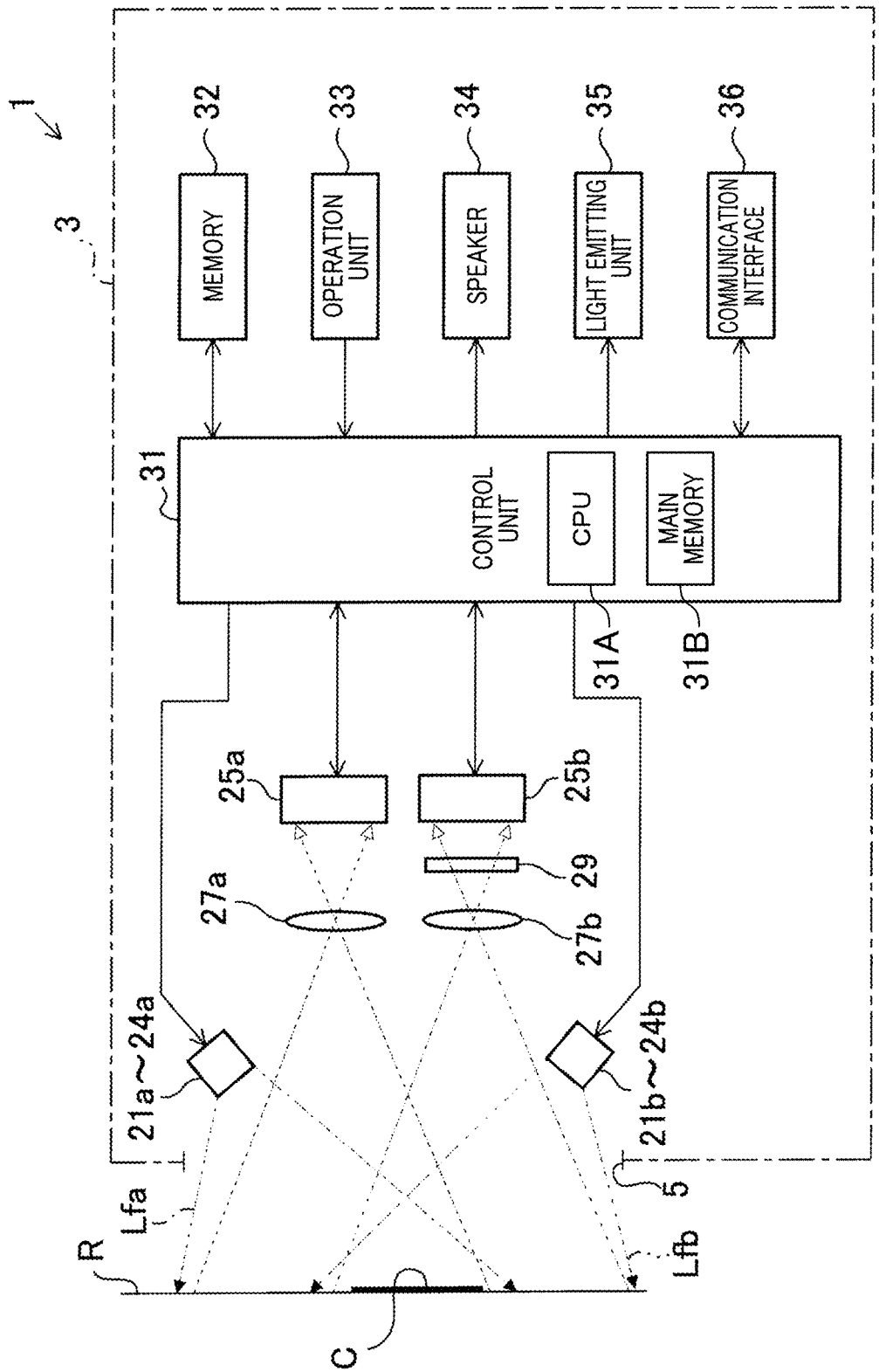
FIG. 4 is a block diagram illustrating an electrical configuration of the information code reader of FIG. 1.

As shown in FIG. 4, a control unit 31 that controls the entire information code reader 1 is provided in the case 3 of the information code reader 1. As an example, the control unit 31 is mainly composed of a microcomputer. Specifically, the control unit 31 has a CPU (i.e., a central processing unit) 31A responsible for calculation, a main memory 31B as a work area, a system bus (not shown), an input/output interface, etc., and constitutes an information processing device together with the memory 32. The control unit 31 is configured to decode the data recorded in the information code by a predetermined decoding method by a reading process performed by using the acquired image of the information code captured by the optical system described later. In the memory 32 (including RAM (random-access memory) and ROM (read-only memory)), a predetermined program or the like for executing a read process or the like is executably stored in advance by the control unit 31. Therefore, the memory 32 functions as a non-transitory computer-readable recording medium, and the procedure of a program (described later) related to a predetermined reading process is stored as a source code. Therefore, the memory 32 functions as a non-transitory computer-readable recording medium, and the procedure of a program (described later) related to a predetermined reading process is stored as a source code. The program is read into the main memory 31B by the CPU 31A and executed. The main memory 31B is configured to be readable and writable by a memory element such as RAM. It goes without saying that the CPU 31A may have a different name (for example, a processor) as long as it is an element that plays a central role in the calculation of a computer system and has the same function.

The reading process executed by the control unit 31 (that is, the CPU 31A) will be described later.

Further, the information code reader 1 includes an optical system such as an illumination unit and an image acquisition unit controlled by a control unit 31 (that is, CPU 31A) in order to optically read the information code. The optical system is divided into a floodlight optical system and a light receiving optical system. The lighting units constituting the floodlight optical system include first lighting units 21a to 24a that function as a light source capable of radiating visible light by an LED or the like, and light in a predetermined second wavelength band different from the wavelength band of visible light, specifically, second illumination units 21b to 24b that function as a light source capable of radiating infrared light. The radiation states of the first lighting units 21a to 24a and the second lighting units 21b to 24b can be controlled by the control unit 31 that functions as an illumination control unit.

As shown in FIGS. 1 and 2, the paired first lighting unit 21a and second lighting unit 21b and the paired first lighting unit 22a and second lighting unit 22b are provided on one side of the case 3 in the longitudinal direction (along the width direction WD). Further, the paired first lighting unit 23a and second lighting unit 23b and the paired first lighting unit 24a and second lighting unit 24b are provided on the other side of the case 3 in the longitudinal direction (along the width direction WD). The first lighting units 21a to 24a and the second lighting units 21b to 24b are arranged so as to radiate the illumination light in the horizontal plane direction HR toward the center side of the case 3, respectively.

As shown in FIGS. 1 to 3, the projection optical system includes a light guide member 50 that guides the illumination light from the first illumination units 21a to 24a and the second illumination units 21b to 24b. The light guide member 50 is arranged inside the case 3 at a position where the illumination light from the first illumination units 21a to 24a and the second illumination units 21b to 24b is radiated, and these illumination lights are configured to be directed to the outside of the case 3 through the opening region of the reading port 5.

The light guide member 50 includes four reflecting units 51 to 54 as reflecting surfaces for reflecting the illumination light from the first illuminating units 21a to 24a and the second illuminating units 21b to 24b. The reflecting portions 51 and 52 are provided so as to face each other in the front-rear direction FB orthogonal to the longitudinal direction (width direction WD). The reflecting portions 53 and 54 are provided so as to face each other in the direction orthogonal to the front-rear direction FB (that is, the width direction WD), and each is configured as an inclined surface that becomes a lower position as it approaches the other reflecting portion. The entire light guide member 50 has a mortar-shaped structure in which the size of the hole (opening region) becomes narrower as the position moves downward outside the imaging range of the image acquisition unit. The reflecting portions 51 to 54 are composed of, for example, light-shielding members, and the reflecting surface that reflects the illumination light has a predetermined color (for example, a bright color such as white). In each case, the light incident on the outer surface is diffusely reflected.

The first lighting unit 21a and the second lighting unit 21b, the first illumination unit 22a and the second illumination unit 22b are arranged so that the illumination light is emitted from the vicinity of the upper end position of the reflection unit 53 of the light guide member 50 toward the reflection unit 54 and the reflection units 51 and 52. Further, the first illumination unit 23a and the second illumination unit 23b, the first illumination unit 24a and the second illumination unit 24b are arranged so that the illumination light is emitted from the vicinity of the upper end position of the reflection unit 54 of the light guide member 50 toward the reflection unit 53 and the reflection units 51 and 52.

Figure 5:
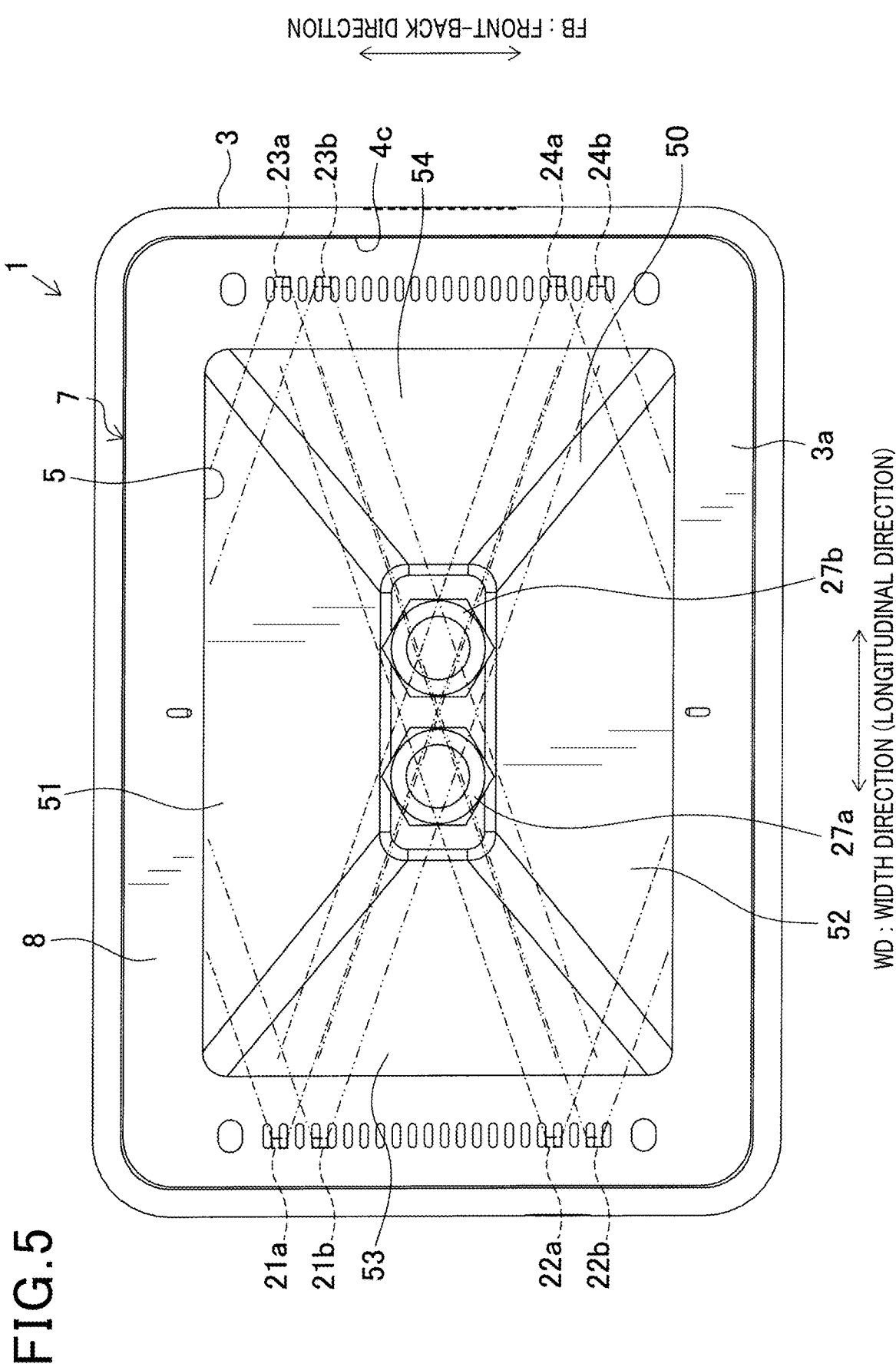
FIG. 5 is an explanatory diagram illustrating an radiation state by the first illumination unit and the second illumination unit using the light guide member.

With such a configuration, as shown in FIG. 5, since the illumination light emitted from the first illumination units 21a to 24a and the second illumination units 21b to 24b is applied to the reflection surface of the light guide member 50 configured in a mortar shape, the reflection units 51 to 54 shine brightly as a whole. In FIG. 4, for convenience, the light guide member 50 is not shown, visible light emitted from the first illumination units 21a to 24a is shown as illumination light Lfa, and infrared light emitted from the second illumination units 21b to 24b is shown as illumination light Lfb toward the information code C displayed on the object to be read R.

As shown in FIG. 4, The light receiving optical system is composed of two image acquisition units (hereinafter, also referred to as a first image acquisition unit 25a and a second image acquisition unit 25b), two imaging units (hereinafter, also referred to as first imaging unit 27a and second imaging unit 27b) and the like.

The first image acquisition unit 25a and the second image acquisition unit 25b are each composed of, for example, a light receiving sensor (area sensor) in which solid-state image acquisition elements (light receiving elements) such as a CCD element and a CMOS element are two-dimensionally arranged, and a light receiving surface capable of receiving light from outside the case is arranged on the image forming portion side. As shown in FIG. 3, etc., when the outer surface of a light-transmissive plate 7 provided as a reading port 5 is a reading surface 7a, the first image acquisition unit 25a is mounted on the substrate in a state where its field center La is substantially orthogonal to the reading surface 7a so that it can receive the incident light that has passed through the first imaging unit 27a and is about to enter the light receiving surface. Similarly, the second image acquisition unit 25b is mounted on the same substrate along with the first image acquisition unit 25a in a state where the field-of-view center Lb is substantially orthogonal to the reading surface 7a so that it can receive the incident light that has passed through the second imaging unit 27b and is about to enter the light receiving surface.

The first imaging unit 27a is an imaging optical system composed of a known imaging lens. The imaging range (field of view) that can be imaged by the first image acquisition unit 25a is determined, and the light that has passed through the reading port 5 from the outside of the case 3 is guided to the first image acquisition unit 25a. When an information code or the like is arranged in the imaging range outside the case 3, the first image acquisition unit 25a functions to form an image of the information code or the like. The second imaging unit 27b is an imaging optical system configured in the same manner as the first imaging unit 27a. The imaging range that can be imaged by the second image acquisition unit 25b is determined, and the light that has passed through the reading port 5 from the outside of the case 3 is guided to the second image acquisition unit 25b. When an information code or the like is arranged in the imaging range outside the case 3, the second image acquisition unit 25b functions to form an image of the information code or the like. As the first imaging unit 27a and the second imaging unit 27b, for example, a wide-angle lens having a short focal length and a wide angle of view can be preferably used.

As shown in FIG. 3, between the light receiving surface of the second image acquisition unit 25b and the second imaging unit 27b, a filter that transmits infrared light without transmitting visible light (hereinafter, also referred to as a visible light cut filter 29) is arranged according to the imaging range of the second image acquisition unit 25b.

Therefore, the second image acquisition unit 25*b* is not affected by the ambient visible light even in an outdoor environment where the ambient visible light is too bright, and the image acquisition target can be imaged based on the reflected light from the image acquisition target due to the radiation of infrared light.

Further, the information code reader 1 includes an operation unit 33, a speaker 34, a light emitting unit 35, a communication interface 36, and the like. The operation unit 33 includes one or a plurality of keys provided on the outer surface of the case 3, and is configured to give an operation signal to the control unit 31 in response to a user's key operation. When the control unit 31 receives an operation signal from the operation unit 33, the control unit 31 is configured to perform an operation in response to the operation signal. The speaker 34 is configured as a sounding unit by a known speaker or the like, and is configured to emit various voices such as preset voices and alarm sounds in response to an operation signal from the control unit 31. The light emitting unit 35 is, for example, an LED, and is configured to light up in response to a signal from the control unit 31. The communication interface 36 is configured as an interface for performing data communication with an external device such as a host device, and is configured to perform communication processing in cooperation with the control unit 31.

Next, the information code C to be read by the information code reader 1 configured as described above and the reading process performed by the control unit 31 when reading the information code C will be described.

The information code C to be read in the present embodiment includes not only a normal barcode or QR code printed on a paper medium or the like, but also an information code with enhanced security (hereinafter, also simply referred to as information code Ca), and an information code displayed on a display screen or the like of a mobile terminal (hereinafter, also simply referred to as information code Cb).

First, the information code Ca with enhanced security will be described with reference to FIG. 6.

The information code Ca according to the present embodiment is configured to be used for authenticity determination and the like with enhanced security by covering at least a part of the code region with a covering portion that transmits infrared light without transmitting visible light. FIG. 6, (A) is an image taken (first image taken later) obtained by capturing the information code Ca in a normal environment radiated with visible light. As can be seen from FIG. 6, (A), the information code Ca is printed on a paper medium or the like so as to include a code region Ca1 and a covering portion Ca2 that covers the entire code region Ca1.

FIG. 6, (B), is a acquired image (second acquired image described later) captured so as to remove the covering portion Ca2 from FIG. 6A. As can be seen from FIG. 6, (B), In the code region Ca1, similar to the QR code, a plurality of light-color modules (light color cells) and dark-color modules (dark color cells) configured as a square region are arranged in a matrix, so that the entire code region Ca1 is configured as a rectangular region. Further, three position detection patterns FPa are arranged as a predetermined number of specific patterns at the three corners of the code region Ca1.

Of the modules constituting the code region Ca1 configured in this way, each bright color module is configured to exhibit light color reflection characteristics when radiated with visible light or infrared light (light in the second wavelength band). Further, each dark color module is configured to exhibit dark color reflection characteristics when radiated with visible light or infrared light. Specifically, each module constituting the code region Ca1 is configured by applying a commonly used ordinary ink.

Further, the covering portion Ca2 transmits the reflected light from each module constituting the code region Ca1 when radiated with infrared light (light in the second wavelength band), and it is configured by applying an ink that hinders the transmission of visible light, for example, an infrared transmissive ink. Therefore, in the normal state where visible light is dominant, as can be seen from FIG. 6, (A), the entire code region Ca1 is visually recognized as being hidden by the covering portion Ca2.

When the information code Ca configured in this way is imaged in a state of being radiated with visible light, as shown in FIG. 6, (A), the covering portion Ca2 is imaged based on the reflected light from the covering portion Ca2, and the code region Ca1 cannot be imaged. On the other hand, when the information code Ca is imaged in a state of being radiated with infrared light, since the reflected light from the code region Ca1 due to the radiation with infrared light passes through the covering portion Ca2, the code region Ca1 can be imaged as shown in FIG. 6, (B). That is, not only the information code Ca cannot be imaged by a normal reading device that cannot radiate infrared light, but also the code region Ca1 cannot be visually recognized, so that the security of the information code Ca can be enhanced. In particular, by adopting the visible light cut filter 29, even in an outdoor environment where the surrounding visible light is too bright, the reflected light from the covering portion Ca2 is not received, so that the code region Ca1 can be clearly imaged.

Next, the information code Cb displayed on the display screen of the mobile terminal or the like will be described with reference to FIG. 7.

The information code Cb according to this embodiment is configured as a QR code displayed on the screen, and at the three corners of the code area, three position detection patterns FPb are arranged as a predetermined number of specific patterns. Since the information code Cb configured in this way is displayed on the screen using visible light, the first image acquisition unit 25*a*, which does not employ the visible light cut filter 29, can take an image like the acquired image (first acquired image described later) shown in FIG. 7, (A). On the other hand, in the second image acquisition unit 25*b* that employs the visible light cut filter 29, the display screen is imaged in black as in the image acquired image (second acquired image described later) shown in FIG. 7, (B), and the information code Cb cannot be imaged.

Therefore, in the reading process performed by the control unit 31 in the present embodiment, the information code Cb is decoded (interpreted) based on the acquired image of the first image acquisition unit 25*a* (hereinafter, also referred to as the first acquired image), and the information code Ca is decoded based on the acquired image of the second image acquisition unit 25*b* (hereinafter, also referred to as the second acquired image). When the information code Ca is the imaging target, the first acquired image is captured as shown in FIG. 6, (A) and the second acquired image is captured as shown in FIG. 6, (B), and when the information code Cb is the imaging target, the first acquired image is captured as shown in FIG. 7, (A) and the second acquired image is captured as shown in FIG. 7, (B).

Hereinafter, the reading process performed by the control unit 31 (that is, the CPU 31A) will be specifically described in detail with reference to the flowchart shown in FIG. 8.

Figure 8:
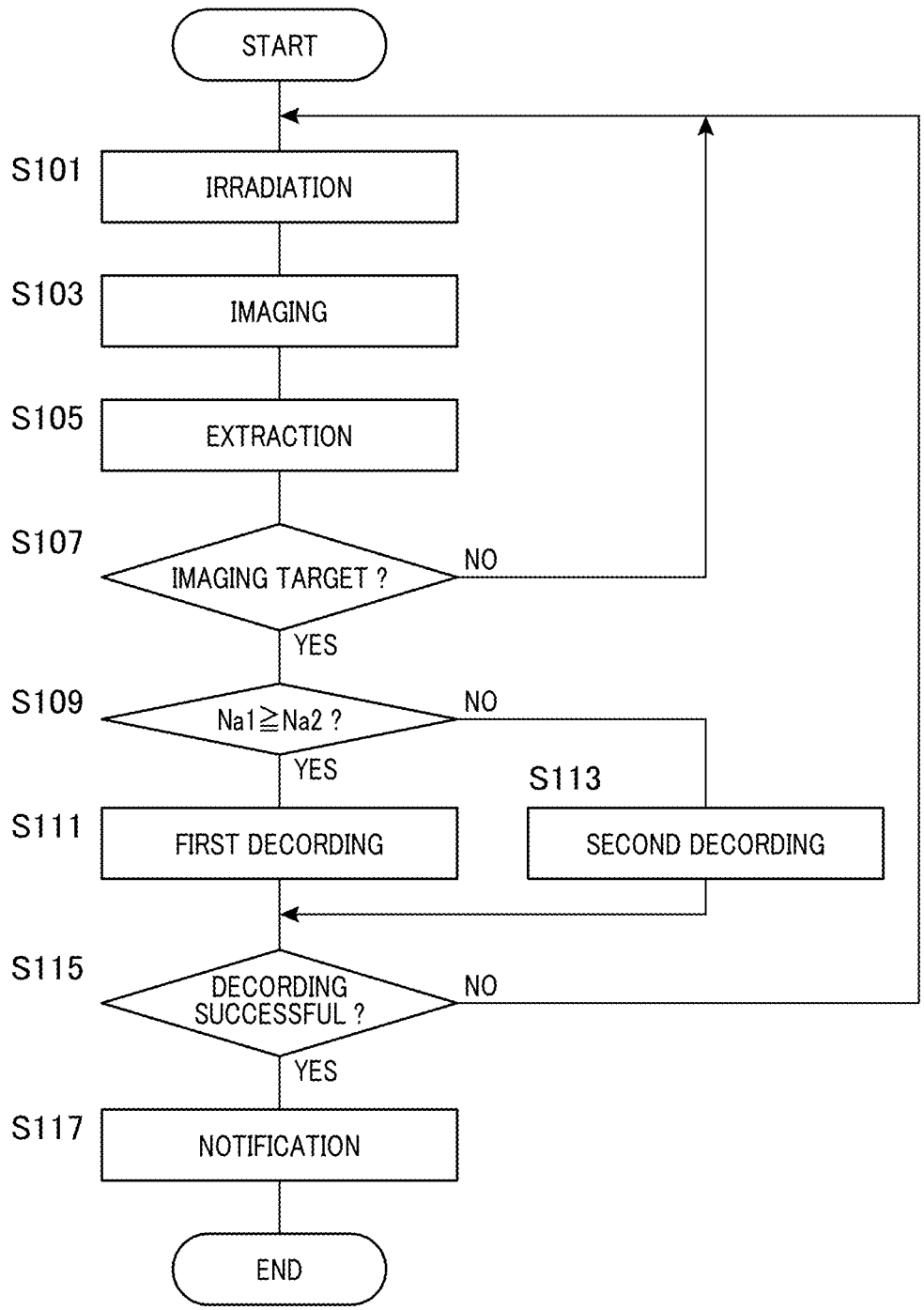
FIG. 8 is a flowchart illustrating a flow of reading processing performed by the control unit in the first embodiment.

When the control unit 31 starts the reading process in response to a predetermined operation or the like on the operation unit 33, the radiation process shown in step S101 of FIG. 8 is performed, visible light is emitted from the first illumination units 21a to 24a, and infrared light is emitted from the second illumination units 21b to 24b. That is, visible light and infrared light are emitted at the same time. As a result, as shown in FIG. 5, the illumination light emitted from the first illumination units 21a to 24a and the second illumination units 21b to 24b is applied to the reflecting surface of the light guide member 50 formed in a mortar shape, and the reflecting portions 51 to 54 are in a state of shining brightly as a whole.

Next, the imaging process shown in step S103 is performed, A process for capturing the first acquired image is performed from the first image acquisition unit 25a, and a process for capturing the second acquired image is performed from the second image acquisition unit 25b.

Subsequently, the extraction process shown in step S105 is performed. In this process, an image analysis process is performed to extract a position detection pattern as a specific pattern of the information code from the first acquired image, and an image analysis process is performed to extract a position detection pattern as a specific pattern of the information code from the second acquired image.

Then, in the determination process of step S107, it is determined whether or not the image acquisition target is being imaged based on the result of the extraction process. Here, when the three position detection patterns are not extracted from any of the first acquired image and the second acquired image, it is determined that the image acquisition target is not imaged (No in S107), and the process from step S101 is performed.

On the other hand, when the three position detection patterns are extracted from either the first acquired image or the second acquired image, it is determined that the imaged target is imaged and Yes in step S107. In this case, in the determination process of step S109, it is determined whether or not the extraction number Na1 of the position detection pattern extracted from the first acquired image is equal to or more than the extraction number Na2 of the position detection pattern extracted from the second acquired image.

Here, when the information code Cb displayed on the screen is imaged, as shown in FIG. 7, (A), the first image acquisition unit 25a captures the first acquired image, and as shown in FIG. 7, (B), the second image acquisition unit 25b captures the second acquired image. Therefore, the extraction number Na1 becomes the extraction number Na2 or more, and it is determined as Yes in step S109, and the first acquired image is set as the decoding target. Then, the first decoding process of step S111 is performed, and the information code Cb is decoded (decoded) based on the first acquired image (FIG. 7, (A)) set as the decoding target.

Then, when this decoding is successful (Yes in S115), the notification process shown in step S117 is performed, and the decoding result or the like is transmitted to the higher-level device or the like via the communication interface 36 to be notified.

If a normal QR code printed on a paper medium, etc. is under imaging, since three position detection patterns are extracted from each of the first acquired image and the second acquired image, the number of extractions Na1 and the number of extractions Na2 are equal. Also in this case, Yes is determined in step S109, the first acquired image is set as the decoding target, and the processes after step S111 are performed.

In addition, when the information code Ca is imaged, as shown in FIG. 6, (A), the first image acquisition unit 25a captures the first acquired image, and as shown in FIG. 6, (B), the second image acquisition unit 25b captures the second acquired image. Therefore, the extraction number Na1 becomes less than the extraction number Na2, and it is determined as No in step S109, and the second acquired image is set as the decoding target. Then, the second decoding process of step S113 is performed, and the information code Ca is decoded (decoded) based on the second acquired image (FIG. 6, (B)) set as the decoding target. Then, when this decoding is successful (Yes in S115), the notification process shown in step S117 is performed, and the decoding result or the like is transmitted to the higher-level device or the like via the communication interface 36 to be notified. In addition, as in the determination process of step S109 above, the control unit 31 that performs the process of setting either one of the first acquired image and the second acquired image as the decoding target may correspond to an example of the "setting unit" based on the results of analysis processing for the first acquired image and the second acquired image. Further, the control unit 31 that performs the first decoding process and the second decoding process can correspond to an example of the "processing unit".

As explained above, in the information code reader 1 according to the present embodiment, the information code is imaged by the first image acquisition unit 25a in a state where visible light is radiated by the first lighting units 21a to 24a, and the information code is imaged by the second image acquisition unit 25b in a state where infrared light (light in the second wavelength band) is radiated by the second illumination units 21b to 24b. Further, a visible light cut filter 29 that transmits infrared light without transmitting visible light is arranged according to the imaging range of the second image acquisition unit 25b.

As a result, if the reading target is the information code Ca whose code region Ca1 is covered with the covering portion Ca2, the reflected light from the coding region Ca1 due to the radiation of infrared light is transmitted through the covering portion Ca2. Therefore, the information code Ca can be decoded based on the second acquired image captured by the second image acquisition unit 25b. In particular, since the visible light cut filter 29 that transmits infrared light without transmitting visible light is arranged in the imaging range of the second image acquisition unit 25b, even in an outdoor environment where the surrounding visible light is too bright, the reflected light from the covering portion Ca2 is not imaged. On the other hand, if the reading target is the information code Cb displayed on the liquid crystal screen or the like, the information code Cb can be decoded based on the first acquired image captured by the first image acquisition unit 25a. Therefore, not only the information code Ca covered with the covering portion Ca2 that cannot transmit visible light but also the information code Cb displayed on the screen can be imaged readably.

Further, in the present embodiment, the control unit 31 that functions as the illumination control unit controls each of the first illumination units 21a to 24a so as to radiate visible light at the time of imaging by the first image acquisition unit 25a. Each of the second illumination units 21b to 24b is controlled so as to radiate infrared light at the time of imaging by the second image acquisition unit 25b.

As a result, when the first image acquisition unit 25a and the second image acquisition unit 25b perform imaging at the same timing as in the present embodiment, visible light and infrared light can be simultaneously radiated. Further, unlike the present embodiment, when the first image acquisition unit 25a and the second image acquisition unit 25b perform imaging at different timings, the radiation timings of visible light and infrared light can be shifted according to the timings. For example, after the first image acquisition unit 25a captures the first acquired image in a state where the first illumination units 21a to 24a radiate the visible light and the second illuminating units 21b to 24b do not radiate the infrared light, it is also possible for the second image acquisition unit 25b to image the second image in a state where the second illumination units 21b to 24b are radiated with infrared light and the first illumination units 21a to 24a are not radiated with visible light.

Especially in the reading process, a process for extracting a position detection pattern (specific pattern) in the code region is performed from each of the first acquired image and the second acquired image, and a large number of acquired images from which the position detection pattern is extracted are set as decoding targets.

If it is a decipherable image, it is imaged so that all position detection patterns are included, and if it is an undecipherable or difficult-to-decipher image, it is possible that it is imaged so that all position detection patterns are not included. Therefore, by setting the decoding target according to the number of extracted position detection patterns as a specific pattern, the decoding target can be easily set, so the processing load related to the decoding process can be further reduced. The decoding target may be set according to the number of extractions of other specific patterns different from the position detection pattern.

Second Embodiment

Next, the information code reader according to the second embodiment of the present invention will be described with reference to the drawings.

The main point of the second embodiment is that in the scanning process, the main difference from the first embodiment is that in the scanning process, one of the two acquired images is set as the decoding target based on the number of black-and-white changes in each specific area of the first acquired image and the second acquired image. therefore, substantially the same components as those in the first embodiment are designated by the same reference numerals, and the description thereof will be omitted.

By setting a part of the range where the information code is easily captured in the acquired image as the specific area, there is a high possibility that a plurality of arranged light-colored cells and dark-colored cells are included in the specific area if the acquired image has an information code captured in a decipherable manner.

Therefore, the number of black-and-white changes when the acquired image is binarized in the specific area is larger than that in the specific area of the acquired image in which the information code is not captured. Here, the number of black-and-white changes is the number of places where black-and-white changes along the scanning lines when one or two or more scanning lines are drawn in a specific area of the acquired image. On the other hand, if the number of changes in black and white along each scanning line is small in the specific area, it is possible that the information code is not imaged decipherably and the information code is imaged undecipherably or difficult to decipher.

Therefore, in the present embodiment, the areas at the same positions of the first acquired image and the second acquired image are extracted as the specific area S. The extracted specific area S is binarized, a process for counting the number of black/white changes in cells in the specific area S is performed, and an acquired image having a large number of changes is set as a decoding target.

Hereinafter, the reading process performed by the control unit 31 (that is, the CPU 31A) in the present embodiment will be specifically described in detail with reference to the flowchart shown in FIG. 9.

Figure 9:
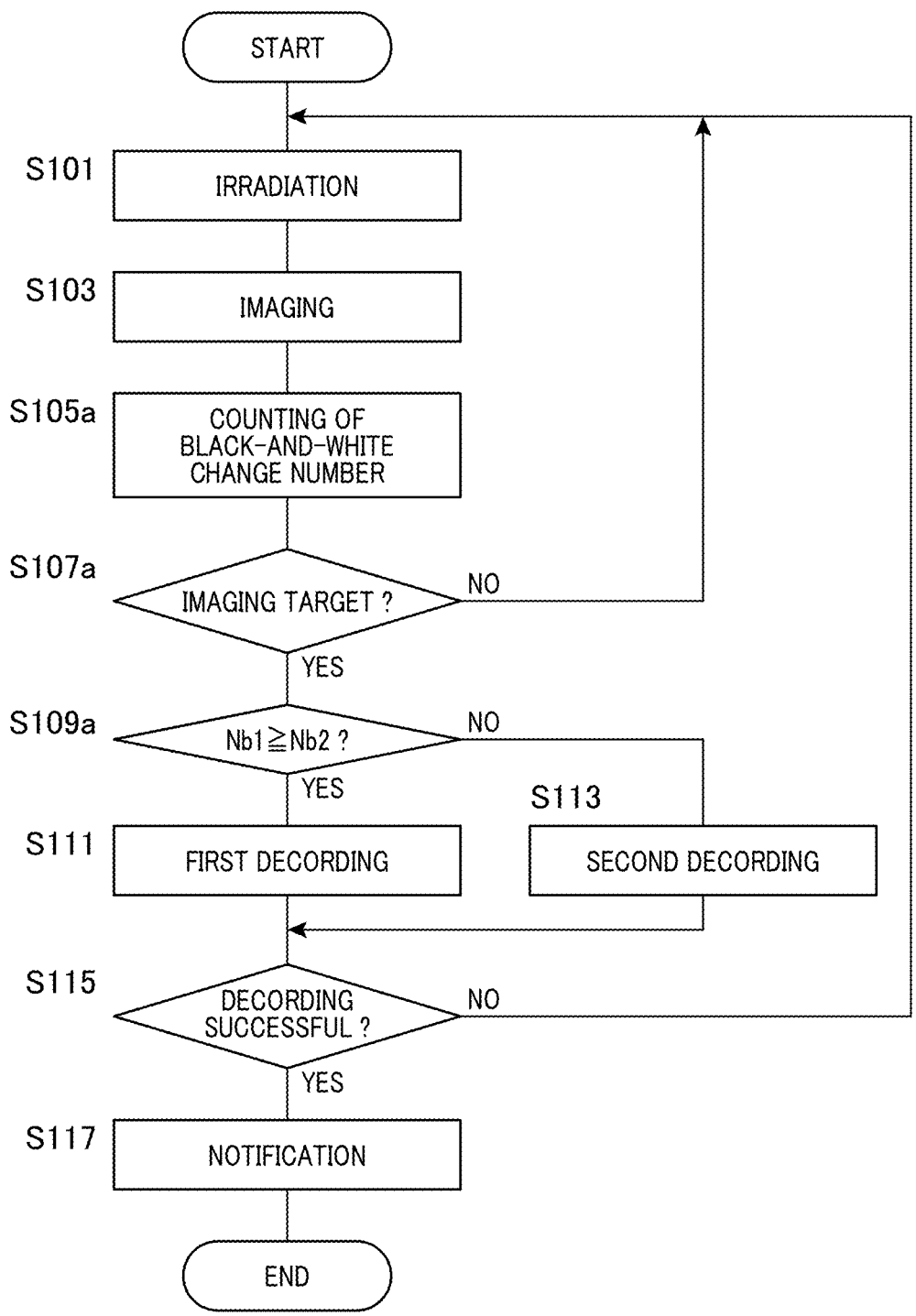
FIG. 9 is a flowchart illustrating the flow of reading processing performed by the control unit in the second embodiment.

Similar to the first embodiment above, visible light is emitted from the first illumination units 21a to 24a, and infrared light is emitted from the second illumination units 21b to 24b (S101 in FIG. 9). A process for capturing the first acquired image is performed from the first image acquisition unit 25a, and a process for capturing the second acquired image is performed from the second image acquisition unit 25b (S103).

Subsequently, the black-and-white change number counting process shown in step S105a is performed. In this process, the specific area S is extracted from each of the first acquired image and the second acquired image. The number of black and white changes in the specific area S in the first acquired image is counted as the black and white change number Nb1, and the number of black and white changes in the specific area S in the second acquired image is counted as the black and white change number Nb2. In the present embodiment, in order to reduce the load related to the counting process of the number of changes in black and white, the central portion of the acquired image is extracted as the specific area S. This is because when the information code is captured, the information code is likely to be located in the central portion of the acquired image.

Then, in the determination process of step S107a, it is determined whether or not the image acquisition target is being imaged based on the number of black and white changes counted as described above. Here, when the black-and-white change number Nb1 of the first acquired image and the black-and-white change number Nb2 of the second acquired image are each equal to or less than a predetermined number, it is determined that the image acquisition target is not imaged (No in S107a), and the process from step S101 is performed.

On the other hand, when at least one of the black-and-white change number Nb1 of the first acquired image and the black-and-white change number Nb2 of the second acquired image is equal to or greater than the above-mentioned predetermined number, it is determined to be Yes in step S107a assuming that the image acquisition target is being imaged. In this case, in the determination process of step S109a, it is determined whether or not the black-and-white change number Nb1 of the first acquired image is equal to or greater than the black-and-white change number Nb2 of the second acquired image.

Here, when the information code Cb displayed on the screen is captured, as shown in FIG. 11, (A), the number of cell black/white changes Nb1 in the specific area S of the first acquired image captured by the first image acquisition unit 25a is counted. Also, as shown in FIG. 11, (B), the number of cell black/white changes Nb2 in the specific area S of the second acquired image captured by the second image acquisition unit 25b is counted. Therefore, the cell black/white change number Nb1 becomes the cell black/white change number Nb2 or more, and it is determined as Yes in step S109a, the first acquired image is set as the decoding target, and the processing after step S111 is performed.

Further, when the information code Ca is imaged, the black-and-white change number Nb1 in the specific area S of the first acquired image captured by the first image acquisition unit 25a is counted as shown in FIG. 10, (A). As shown in FIG. 10, (B), the number of cell black/white changes Nb2 in the specific area S of the second acquired image captured by the second image acquisition unit 25b is counted. Therefore, the black-and-white change number Nb1 becomes less than the black-and-white change number Nb2, and it is determined as No in step S109a, the second acquired image is set as the decoding target, and the processing after step S113 is performed.

As described above, in the information code reader 1 according to the present embodiment, the specific area S in each of the first acquired image and the second acquired image is binarized. A process is performed for counting the cell black/white changes Nb1 and Nb2 in which black and white cells change along one or more scanning lines in the specific area S, and the acquired image having a large number of changes is set as a decoding target.

In this way, by setting the decoding target according to the number of changes in black and white in the specific area S, the decoding target can be easily set, so that the processing load related to the decoding process can be further reduced.

Third Embodiment

Next, the information code reader according to the third embodiment of the present invention will be described with reference to FIG. 12.

The third embodiment is mainly different from the first embodiment in that an infrared light cut filter is newly adopted. Therefore, substantially the same components as those in the first embodiment are designated by the same reference numerals, and the description thereof will be omitted.

Since infrared light has a longer wavelength than visible light, when the first image acquisition unit 25a captures the first acquired image in a state where both infrared light and visible light are radiated, the information code may not be clearly imaged due to blurring or the like caused by the influence of the infrared light if the influence of the reflected light by the infrared light is large.

Figure 12:
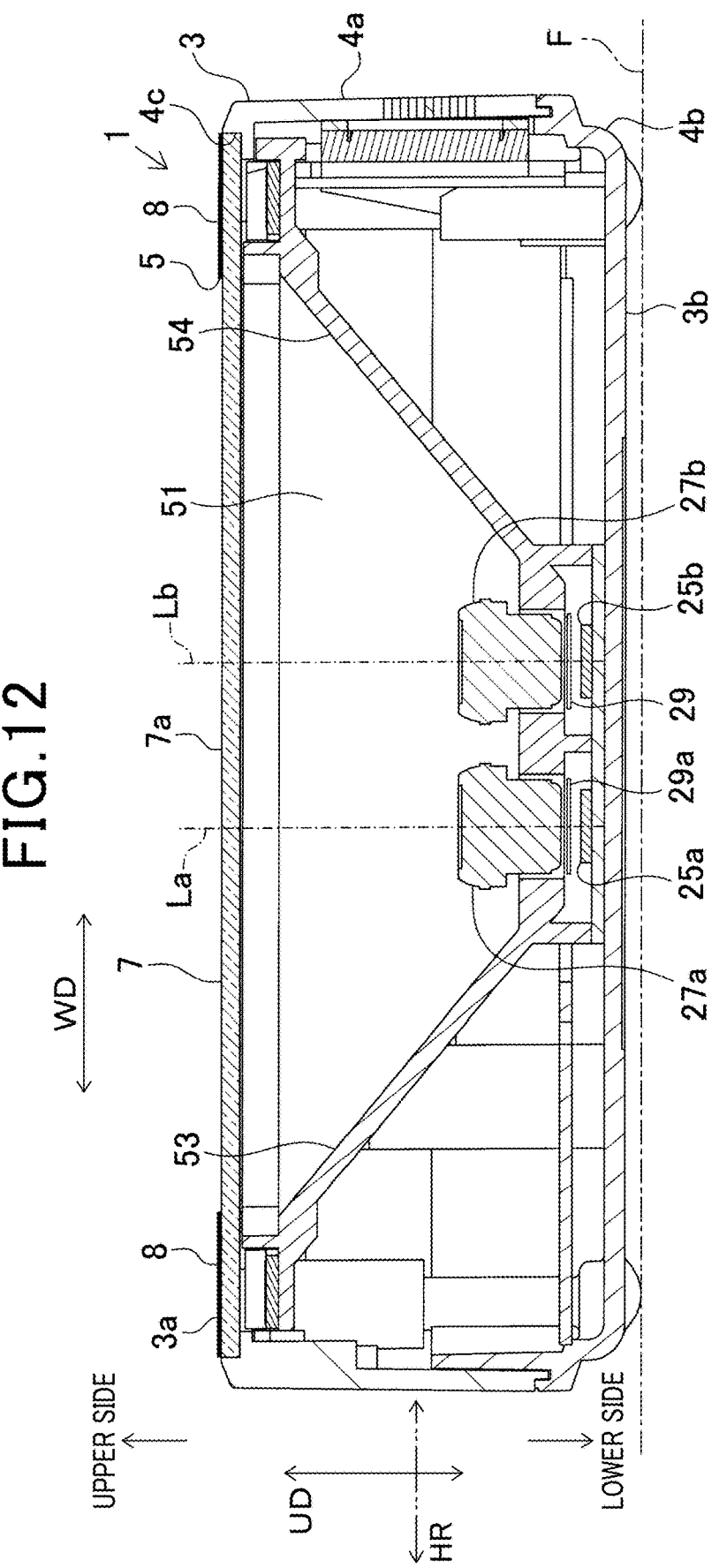
FIG. 12 is a schematic cross-sectional view showing a main part of the information code reader according to the third embodiment.

Therefore, in the present embodiment as shown in FIG. 12, another filter (hereinafter, also referred to as an infrared light cut filter 29a) that transmits visible light without transmitting infrared light (light in the second wavelength band) is arranged between the light receiving surface of the first image acquisition unit 25a and the first imaging unit 27a according to the imaging range of the first image acquisition unit 25a.

As a result, when the information code is imaged by the first image acquisition unit 25a in the state of being radiated with visible light, since the reflected light caused by the radiation of the infrared light is not imaged by the first image acquisition unit 25a even if the second illumination units 21b to 24b radiate the infrared light, the information code can be imaged more clearly without being affected by the radiation of the infrared light.

The infrared light cut filter 29a is not limited to being arranged between the light receiving surface of the first image acquisition unit 25a and the first imaging unit 27a, but is arranged on the reading surface side of the first imaging unit 27a. Similarly, the visible light cut filter 29 is not limited to being arranged between the light receiving surface of the second image acquisition unit 25b and the second imaging unit 27b, but is arranged on the reading surface side of the second imaging unit 27b. Further, the characteristic configuration of the present embodiment in which the infrared light cut filter 29a is newly adopted can be applied to other embodiments.

Fourth Embodiment

Next, the information code reader according to the fourth embodiment of the present invention will be described with reference to FIG. 13.

The fourth embodiment is mainly different from the first embodiment in that the first image acquisition unit 25a and the second image acquisition unit 25b are arranged so that the centers of the fields of view mutually cross at the reading surface 7a. Therefore, substantially the same components as those in the first embodiment are designated by the same reference numerals, and the description thereof will be omitted.

By simply arranging the first image acquisition unit 25a and the second image acquisition unit 25b side by side in the case 3 as in the first embodiment. when the respective field-of-view centers La and Lb are orthogonal to the reading surface 7a (see FIG. 3), the imaging range on the reading surface 7a differs between the first image acquisition unit 25a and the second image acquisition unit 25b. Therefore, the position of the reading surface 7a suitable for holding the information code Ca and the position of the reading surface 7a suitable for holding the information code Cb displayed on the screen are different.

Figure 13:
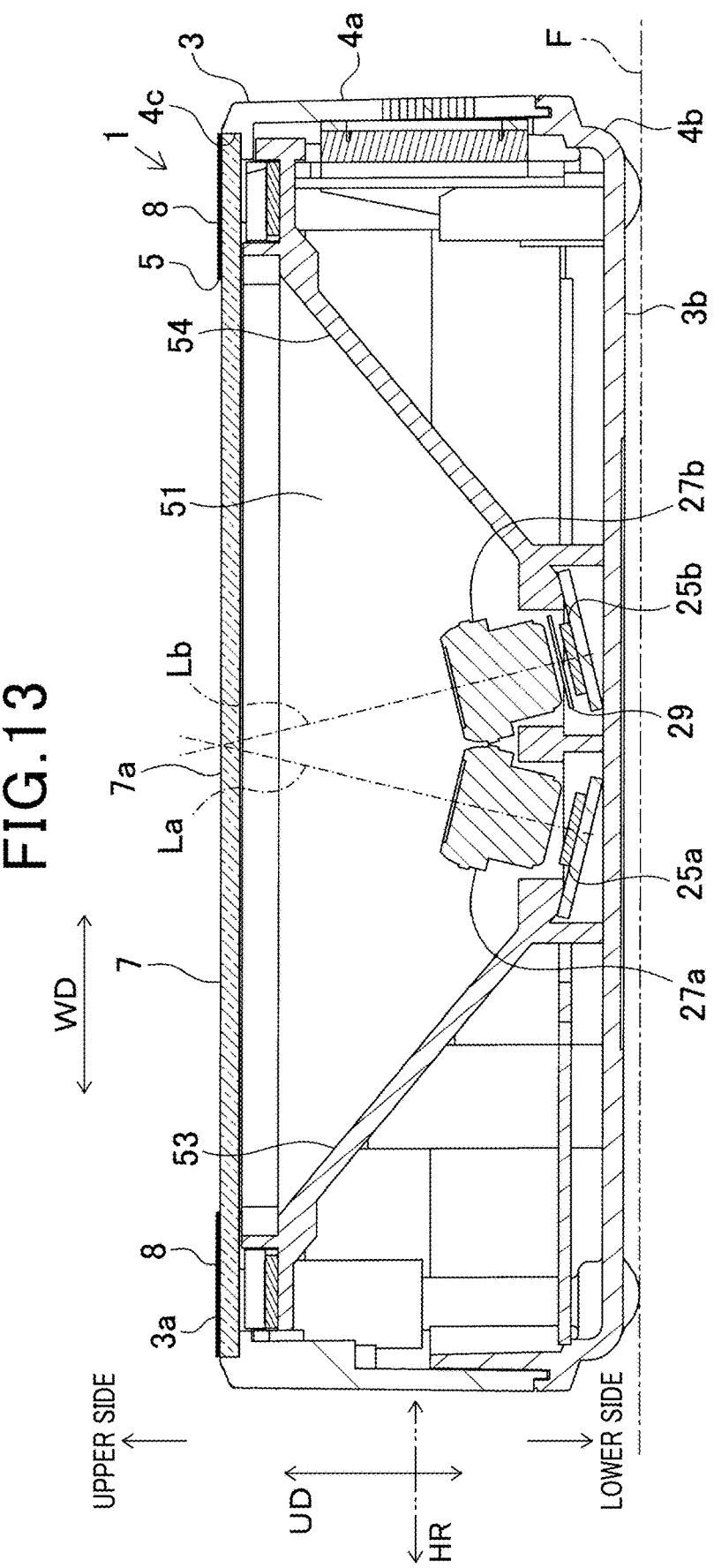
FIG. 13 is a schematic cross-sectional view showing a main part of the information code reader according to the fourth embodiment.

Therefore, in the present embodiment as shown in FIG. 13, the first and second image acquisition units 25a and 25 and the first and second imaging units 27a and 27b are arranged in the case 3 with the reading surface 7a. Practically the units 25a and 25b, and 27a and 27b are arranged such that the center La of the field of view of the first image acquisition unit 25a and the center Lb of the field of view of the second field of the second image acquisition unit 25b intersect at the center of the reading surface 7a, thus making it possible to acquire the image of an information code placed on or held over the reading surface 7a. Therefore, in the present embodiment as shown in FIG. 13, the substrate on which the first image acquisition unit 25a is mounted and the substrate on which the second image acquisition unit 25b is mounted are arranged in an inclined state according to the angle between the field-of-view center La and the field-of-view center Lb.

In this way, by arranging the first image acquisition unit 25a, the second image acquisition unit 25b, and the like so that the respective field-of-view centers La and Lb intersect at the center of the reading surface 7a over which the information code is easily held, the position of the reading surface 7a suitable for holding the information code Ca and the position of the reading surface 7a suitable for holding the information code Cb can be aligned at the center of the reading surface 7a.

Figure 14:
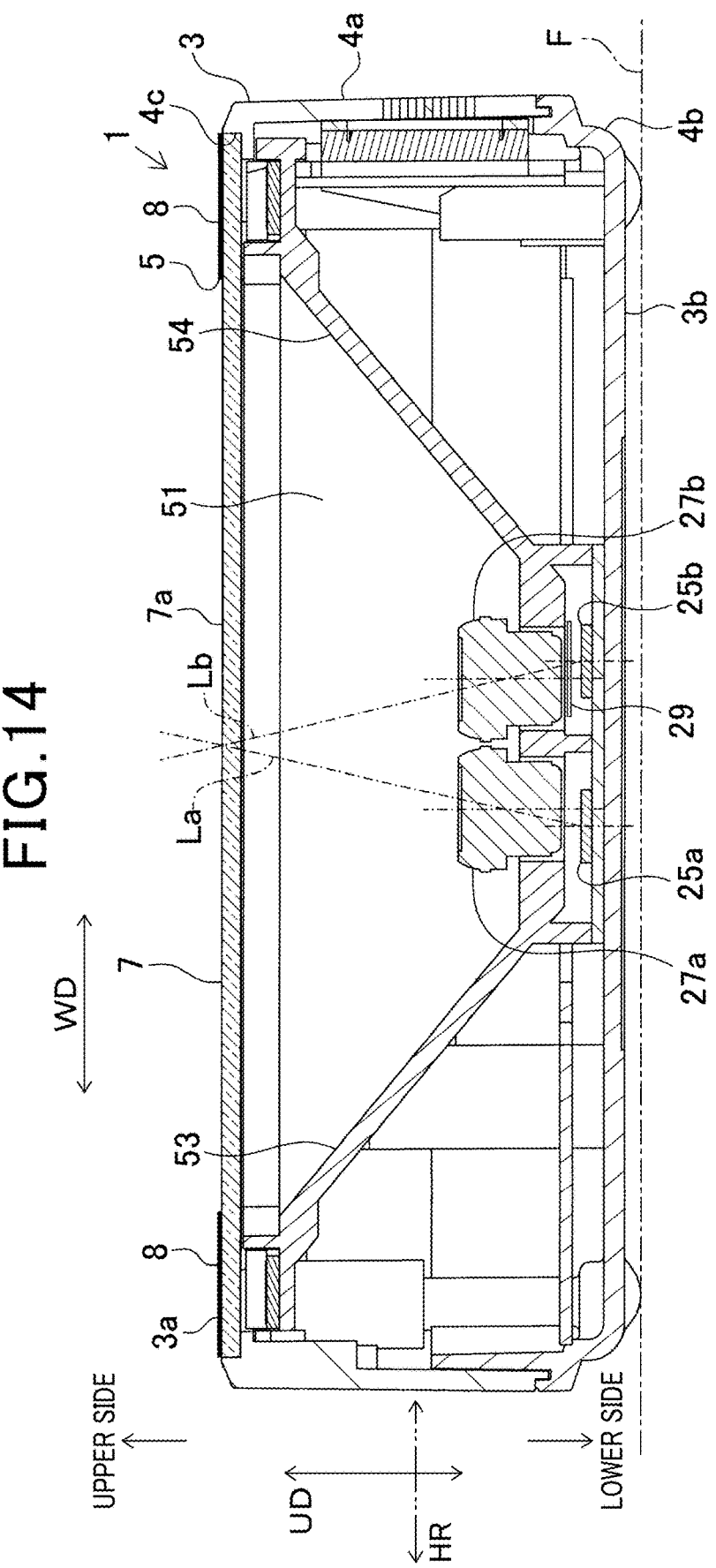
FIG. 14 is a schematic cross-sectional view showing a main part of an information code reader according to a modified example of the fourth embodiment.

As in the modified example shown in FIG. 14, with respect to the first image acquisition unit 25a and the second image acquisition unit 25b mounted on the same substrate, the field-of-view center La of the first image acquisition unit 25a and the field-of-view center Lb of the second image acquisition unit 25b may intersect at the center of the reading surface 7a by arranging the first imaging unit 27a and the second imaging unit 27b so as to be eccentric. As described above, the characteristic configurations of the present embodiment and the modified example in which the first image acquisition unit 25a, the second image acquisition unit 25b, and the like are arranged so that the center of the field-of-view intersects the reading surface 7a are also applied to other embodiments.

Fifth Embodiment

Next, the information code reader according to the fifth embodiment of the present invention will be described with reference to the drawings.

In the fifth embodiment, similarly to the first embodiment, it includes a first illumination unit that radiates visible light, a second illumination unit that radiates light in the second wavelength band, a first image acquisition unit, and a second image acquisition unit in which a visible light cut filter is arranged in an imaging range. On the other hand, it is mainly different from the first embodiment in that it is configured so that the optical arrangement configuration and the like are different.

Figure 15:
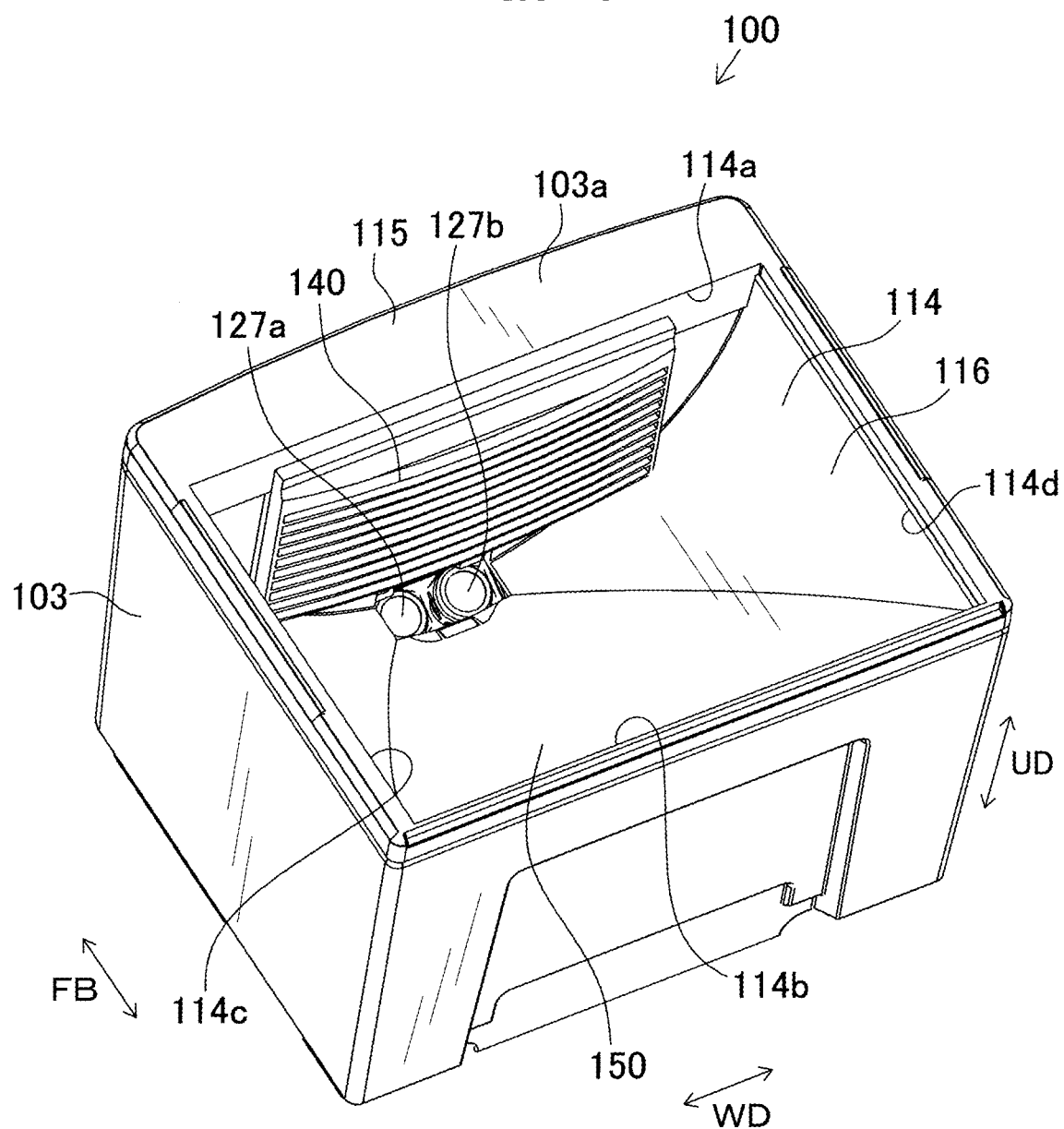
FIG. 15 is a perspective view showing an information code reader according to a fifth embodiment.

Specifically, as shown in FIG. 15, the information code reader 100 according to the present embodiment is a stationary reading device mounted on the mounting surface with the upper surface of a desk, a shelf, or the like as the mounting surface, and it is configured as a acquired image storage device that can not only optically read display information (optical information) such as information code and character information displayed on the acquired image target, but also store the acquired image of the image target. In the present embodiment, a display medium in which predetermined character information or the like using a specific character format such as a passport is displayed on the display surface in addition to the information code is targeted for imaging. Therefore, the information code reader 100 is configured to have a known symbol recognition processing function (OCR) for recognizing captured character information and the like, in addition to a function as an information code reader for reading the information code.

The information code reader 100 includes a substantially box-shaped case 103 that constitutes the outer shell of the information code reader 100 with a resin material such as ABS resin. Further, the information code reader 100 has the same main basic electrical configuration as the information code reader 1, and is configured to include a control unit 31, a memory 32, an operation unit 33, a speaker 34, a light emitting unit 35, a communication interface 36, and the like.

Figure 16:
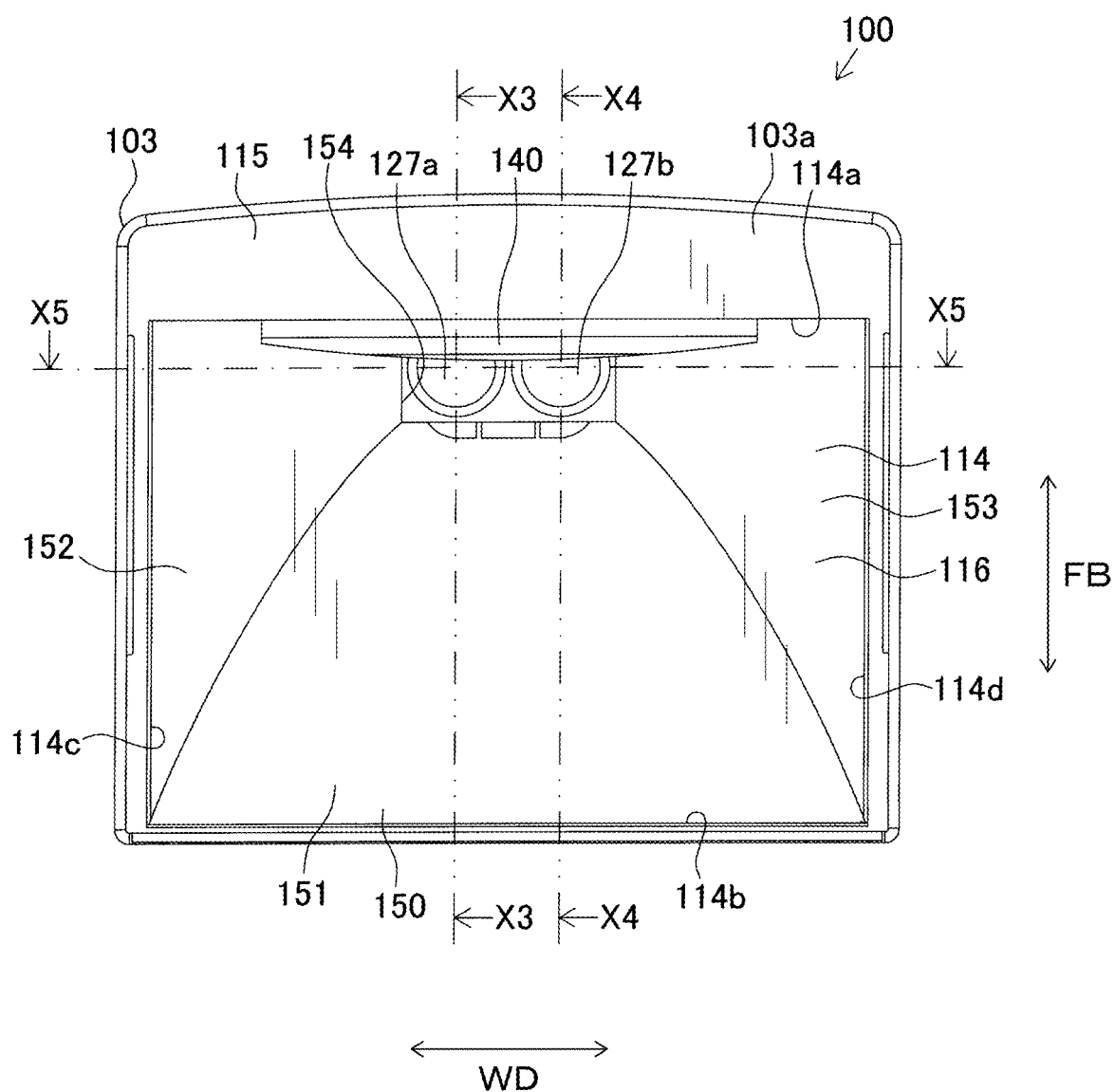
FIG. 16 is a plan view of the information code reader of FIG.

As shown in FIGS. 15 and 16, a reading surface 114 serving as an entrance/exit of light is optically formed on the upper surface 103*a* of the case 103 via a translucent protective plate 116 described later. The reading surface 114 is formed so as to open in a rectangular shape as an optical reading port. Light from the outside of the case enters the case through the reading surface 114, and the light from the inside of the case is emitted to the outside of the case. Then, the light receiving optical system composed of the first image acquisition unit, the second image acquisition unit, and the like functions to image the display medium held over the reading surface 114.

The upper surface 103*a* of the case 103 is composed of a reading surface 114 and a strip-shaped one end 115 connected to the side 114*a* of the reading surface 114, and is protected by a protective plate 116 so that the reading port is closed. The protective plate 116 is configured as a flat plate having a predetermined thickness, and is composed of a translucent (light transmissive) plate (for example, transparent acrylic resin, transparent glass, etc.) that allows light from outside the case and light from inside the case to pass through.

Of the four sides of the reading surface 114, the side 114*b* facing the side 114*a* corresponds to one edge of the upper surface 103*a* of the case 103, and the other two sides 114*c* and 114*d* of the four sides of the reading surface 114 also correspond to the other edge of the upper surface 103*a* of the case 103, respectively.

Next, the light projecting optical system and the light receiving optical system of the information code reader 100 will be described.

Figure 17:
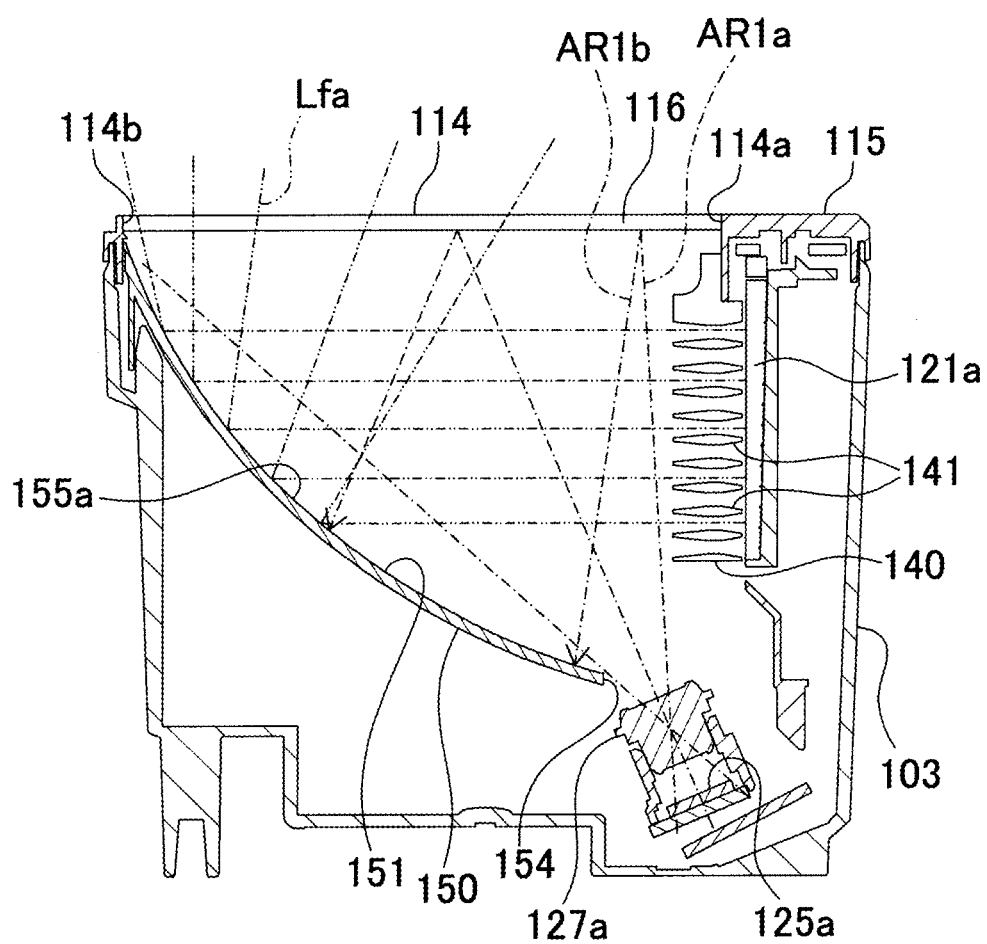
FIG. 17 is a schematic cross-sectional view schematically showing a cross section of X3-X3 of FIG. 16.
Figure 18:
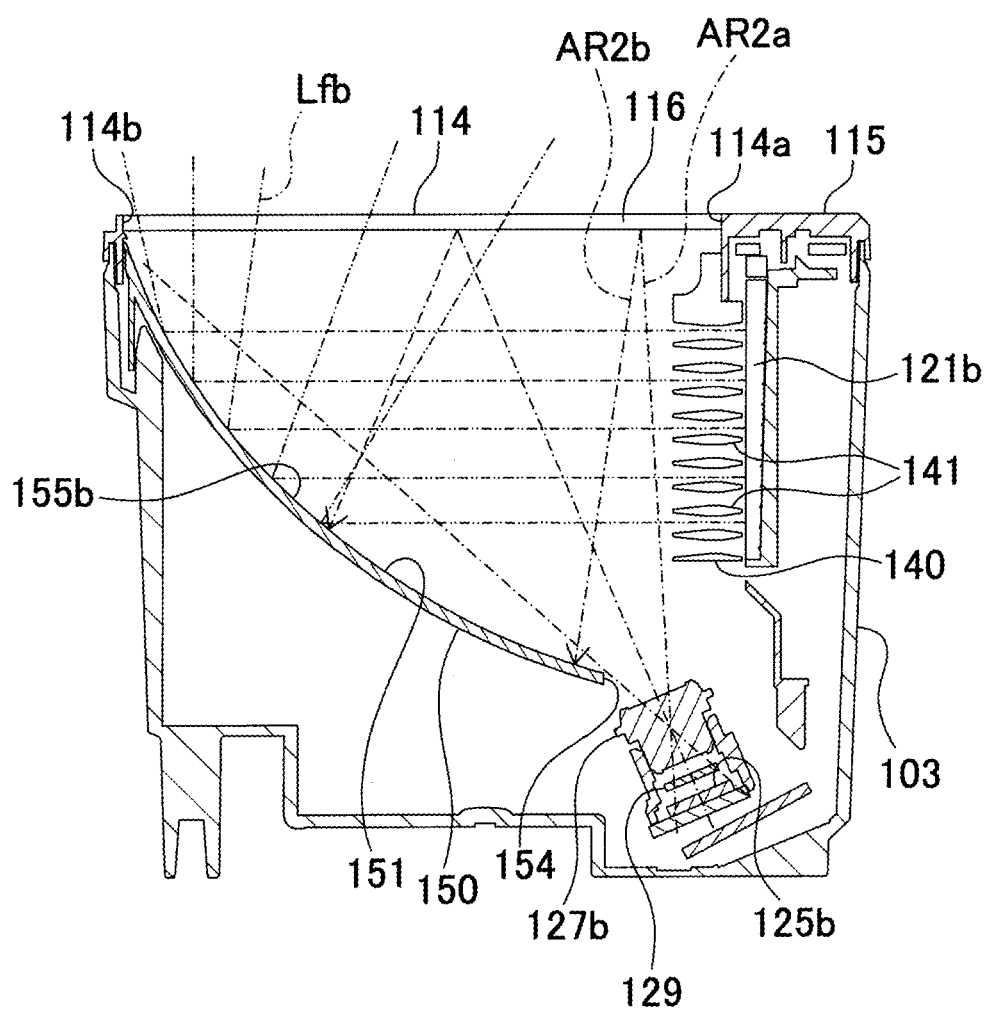
FIG. 18 is a schematic cross-sectional view schematically showing a cross section of X4-X4 of FIG. 16.
Figure 19:
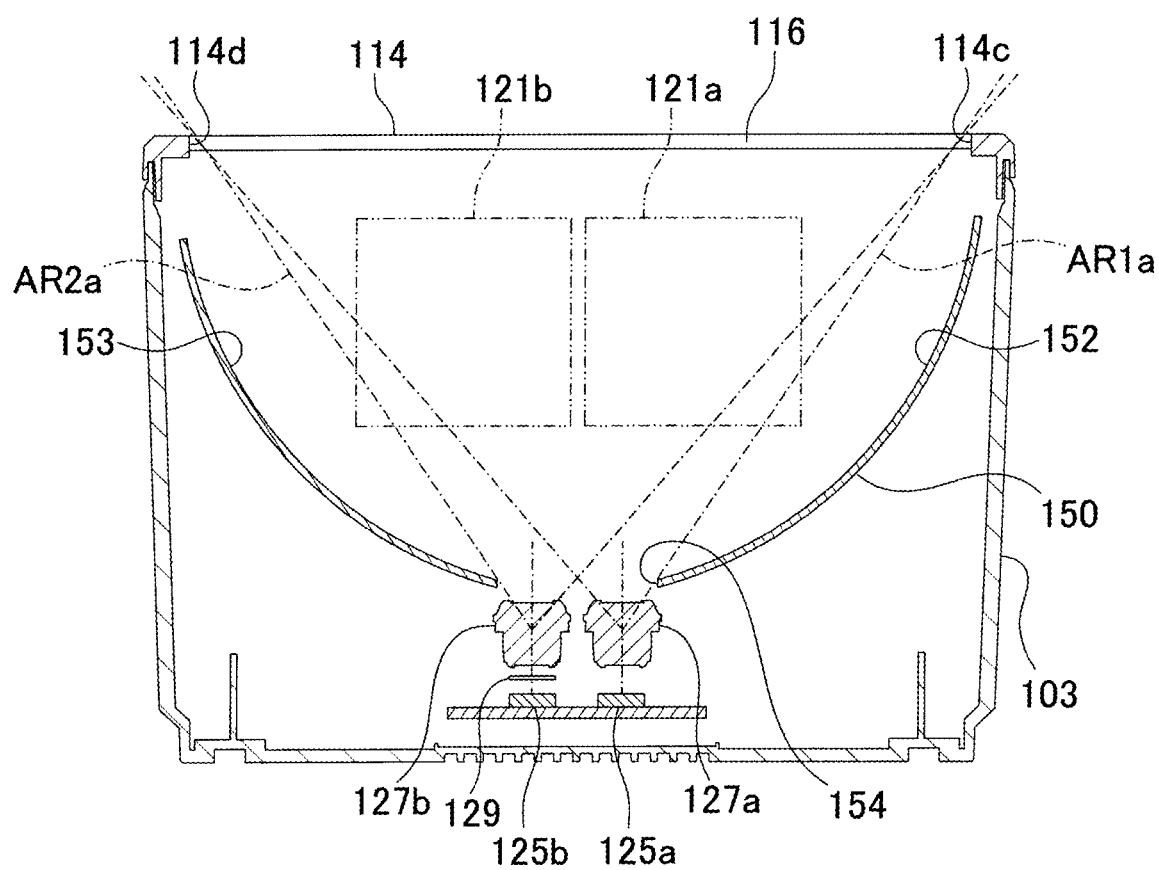
FIG. 19 is a schematic cross-sectional view schematically showing a cross section of X5-X5 of FIG. 16

As shown in FIGS. 17 to 19, the projection optical system in this embodiment includes a first illumination unit 121*a* and a second illumination unit 121*b*, a louver 140, a reflection member 150, and the like that function as a surface light source capable of radiating uniform illumination light. The first illumination unit 121*a* is configured to radiate uniform visible light as a surface light source. Further, the second illumination unit 121*b* is configured to radiate uniform second wavelength band light, specifically, infrared light, as a surface light source. The radiation state of the first illumination unit 121*a* and the second illumination unit 121*b* is configured to be controllable by a control unit 31 that functions as an illumination control unit. The first illumination unit 121*a* and the second illumination unit 121*b* are arranged below one end portion 115, and are configured to radiate visible light and infrared light toward the reflection member 150 via the louver 140. In this way, since the surface light source is adopted as the first illumination unit 121*a* and the second illumination unit 121*b*, it is possible to suppress variations in the illuminance distribution on the reflecting member 150 radiated with the illumination light (visible light and infrared light) even through the louver 140. In FIG. 17, the visible light emitted from the first illumination unit 121*a* is shown as the illumination light Lfa, and the infrared light emitted from the second illumination unit 121*b* is shown as the illumination light Lfb.

As shown in FIGS. 17 and 18, the louver 140 is arranged on the radiation side of the first illumination unit 121*a* and the second illumination unit 121*b*, and each blade plate 141 is arranged along a plane parallel to the reading surface 114. Specifically, each blade plate 141 is arranged so as to be parallel to the reading surface 114. The louver 140 uses each wing plate 141 to make the radiation direction of visible light from the first illumination unit 121*a* and the radiation direction of infrared light from the second illumination unit 121*b* substantially parallel to the reading surface 114.

The reflection member 150 is arranged inside the case 103 at a position where the illumination light (visible light and infrared light) is radiated through the louver 140 and outside the first pre-reflection imaging range AR1*a* and the second pre-reflection imaging range AR2*a*, which will be described later. The structure is such that the illumination light is guided to be emitted to the outside of the case 103 through the reading surface 114. The reflection member 150 includes a reflection unit 151, a reflection unit 152, and a reflection unit 153. As shown in FIGS. 17 and 18, the reflecting portion 151 is formed so as to be curved so that the upper end thereof faces the side 114*b* of the reading surface 114 and is concave outward. Also, as shown in FIG. 19, the reflecting portion 152 is formed so as to be curved so that the upper end thereof faces the side 114*c* of the reading surface 114 and is concave outward. Further, the reflecting portion 153 is formed so as to be curved so that the upper end thereof faces the side 114*d* of the reading surface 114 and is concave outward. Moreover, an opening 154 for exposing the image forming portion and the like is formed at the lower end of the reflecting portion 151 and the like.

The light receiving optical system in the present embodiment has the same function as the light receiving optical system in the first embodiment, and it is composed of two image acquisition units (hereinafter, also referred to as a first image acquisition unit 125a and a second image acquisition unit 125b), two imaging units (hereinafter, also referred to as first imaging unit 127a and second imaging unit 127b), a visible light cut filter 129, and the like. As shown in FIG. 17, the first image acquisition unit 125a is mounted on the substrate so that the light incident through the reading surface 114 can receive the incident light that has passed through the first imaging unit 127a and is about to enter the light receiving surface. Also, as shown in FIG. 18, the second image acquisition unit 125b is mounted on the substrate so that the light incident through the reading surface 114 can receive the incident light that has passed through the second imaging unit 127b and visible light cut filter 129, and is about to enter the light receiving surface.

The first imaging unit 127a defines the first imaging range (i.e., spatial range) that can be imaged by the first image acquisition unit 125a, and guides the light that has passed through the reading surface 114 from the outside of the case 103 to the first image acquisition unit 125a. When an information code or the like is arranged in the first imaging range outside the case 103, it functions to form an image of the information code or the like on the first image acquisition unit 125a. The second imaging unit 127b defines a second imaging range (i.e., the spatial range) that can be imaged by the second image acquisition unit 125b, and guides the light that has passed through the reading surface 114 from the outside of the case 103 to the second image acquisition unit 125b. When an information code or the like is arranged in the second imaging range outside the case 103, it functions to form an image of the information code or the like on the second image acquisition unit 125b. As the first imaging unit 127a and the second imaging unit 127b, for example, a wide-angle lens having a short focal length and a wide angle of view can be preferably used.

As shown in FIGS. 18 and 19, between the light receiving surface of the second image acquisition unit 125b and the second imaging unit 127b, Visible light cut filter 129 which transmits infrared light without transmitting visible light is placed in accordance with the imaging range of the second image acquisition unit 125b. Therefore, the second image acquisition unit 125b is not affected by the ambient visible light even in an outdoor environment where the ambient visible light is too bright, the image acquisition target can be imaged based on the reflected light from the image acquisition target due to the radiation of infrared light.

In particular, in the present embodiment as shown in FIG. 17, The first imaging range is provided to have a first pre-reflection imaging range AR1a spatially formed between the first imaging unit 127a and the reading surface 114 and a first post-reflection imaging range AR1b spatially formed between the reading surface 114 and the reflecting member 150 so as to continue from the first pre-reflection imaging range AR1a, although being bent, when the illuminated light is reflected toward inside of case by the protective plate 116 or others at the reading surface 114. In this case, the first imaging unit 127a is arranged so that each of the reflection units 151 to 153 is positioned outside the first pre-reflection imaging range AR1a.

Further, as shown in FIG. 18, the second imaging range is provided to have a second pre-reflection imaging range AR2a spatially formed between the second image acquisition unit 127b and the reading surface 114 and a second post-reflection imaging range AR2b spatially formed between the reading surface 114 and the reflecting member 150 so as to continue from the second pre-reflection imaging range AR2a, although being bent, when the illuminated light is reflected toward inside of the case by the protective plate 116 or others at the reading surface 114, the second imaging unit 127b is positionally arranged so that each reflection unit 151 to 153 is outside the second pre-reflection imaging range AR2a. That is, the reflection member 150 is arranged at a position outside the first pre-reflection imaging range AR1a and outside the second pre-reflection imaging range AR2a. Further, in order to suppress reflection in the acquired image, the first illumination unit 121a and the second illumination unit 121b, the louver 140, the first image acquisition unit 125a and the second image acquisition unit 125b, the first imaging unit 127a and the second imaging unit 127b are arranged at positions in the first post-reflection imaging range AR1b and outside the second post-reflection imaging range AR2b.

Then, in order to suppress the influence of the reflection of visible light on the acquired image, the first illumination unit 121a is arranged so as to radiate visible light so that the illuminance distribution on the first reflection surface 155a is substantially uniform (see FIG. 17), toward the first reflecting surface 155a which is the imaging range AR1b after the first reflection of the reflecting portions 151 to 153. Similarly, in order to suppress the influence of the reflection of infrared light on the acquired image, the second illumination unit 121b is arranged so as to radiate infrared light so that the illuminance distribution on the second reflection surface 155b becomes substantially uniform (see FIG. 18), toward the second reflecting surface 155b, which is the imaging range AR2b after the second reflection of the reflecting portions 151 to 153.

In the information code reader 100 configured in this way, for example, when reading the information code Cb displayed on the display screen of the mobile terminal, the display screen and the like are imaged by the first image acquisition unit 125a and the second image acquisition unit 125b in a state of being radiated with visible light and infrared light reflected by the reflecting member 150. In this case, the determination process in step S109 determines Yes, and the information code Cb is decoded based on the first acquired image captured by the first image acquisition unit 125a.

At that time, as a result, the first imaging range includes the first post-reflection imaging range AR1b, which is inside the case from the reading surface 114 (protective plate 116) due to reflection by the protective plate 116, and not only the display screen of the mobile terminal but also the first reflecting surface 155a and the second reflecting surface 155b of the reflecting member 150 are faintly reflected in the first acquired image. Since the first reflecting surface 155a and the second reflecting surface 155b are radiated with illumination light (visible light and infrared light) so that the illuminance distribution is substantially uniform, the first reflecting surface 155a and the second reflecting surface 155b are radiated with illumination light (visible light and infrared light), for example, as compared with the case where the illuminance distribution varies so that the first reflecting surface 155a and the second reflecting surface 155b have a high illuminance range, the illumination light is made inconspicuous while ensuring the required illuminance in the acquired image.

Further, for example, when reading the information code Ca printed on a paper medium or the like, the paper medium or the like is imaged by the first image acquisition unit 125a and the second image acquisition unit 125b in a state of being radiated with visible light and infrared light reflected by the reflecting member 150. In this case, No is determined by the determination process in step S109, and the information code Ca is decoded based on the second acquired image captured by the second image acquisition unit 125b.

At that time, as a result, the second imaging range includes the second post-reflection imaging range AR2b, which is inside the case from the reading surface 114 due to reflection by the protective plate 116. Not only the paper medium or the like, but also the first reflecting surface 155a and the second reflecting surface 155b of the reflecting member 150 are faintly reflected in the second acquired image. Even in this case, since the first reflecting surface 155a and the second reflecting surface 155b are radiated with illumination light (visible light and infrared light) so that the illuminance distribution is substantially uniform, it is possible to make the illumination light inconspicuous while ensuring the required illuminance in the acquired image.

As described above, in the information code reader 100 according to the present embodiment, a reflective member 150 is provided that reflects visible light emitted from the first illumination unit 121a and light in the second wavelength band emitted from the second illumination unit 121b toward the reading surface 114. Then, the reflection member 150 is arranged at a position outside the first pre-reflection imaging range AR1a and outside the second pre-reflection imaging range AR2a. The first illumination unit 121a, the second illumination unit 121b, the first image acquisition unit 125a, the second image acquisition unit 125b, and the visible light cut filter 129 are arranged at positions outside the first post-reflection imaging range AR1b and outside the second post-reflection imaging range AR2b. Then, the first illumination unit 121a radiates visible light toward the first reflection surface 155a of the reflection member 150, which is the imaging range AR1b after the first reflection. The second illumination unit 121b radiates the light of the second wavelength band toward the second reflection surface 155b which is the imaging range AR2b after the second reflection of the reflection member 150.

As a result, when the information code held over the reading surface 114 is imaged, the entire first reflecting surface 155a of the reflecting member 150 radiated with visible light and the entire second reflecting surface 155b of the reflecting member 150 radiated with light in the second wavelength band can be easily imaged even if the inside of the case is reflected in the acquired image from the reading surface 114 due to reflection by the display surface or the like on which the information code is displayed. Therefore, as compared with the case where the first illumination unit 121a and the second illumination unit 121b are directly imaged, while ensuring the required illuminance in the acquired image, the illumination light (visible light or light in the second wavelength band) becomes inconspicuous and the generation of noise light due to the illumination light can be suppressed. Thus even when the first illumination unit 121a and the second illumination unit 121b are housed in the case, it is possible to suppress the influence of noise light due to the reflection of the illumination light on the acquired image.

In particular, the first illumination unit 121a radiates visible light so as to suppress variations in the illuminance distribution on the first reflection surface 155a, and the second illumination unit 121b radiates the light in the second wavelength band so as to suppress the variation in the illuminance distribution on the second reflection surface 155b. Therefore, the illuminance distribution on the first reflecting surface 155a and the second reflecting surface 155b tends to be uniform, and as a result, the illumination light becomes less noticeable in the acquired image. Hence, it is possible to reliably suppress the influence of noise light due to the reflection of illumination light on the acquired image.

Further, since the first illumination unit 121a and the second illumination unit 121b are surface light sources, it is possible to radiate the first reflection surface 155a and the second reflection surface 155b with illumination light with substantially uniform illuminance. Therefore, the noise light suppression effect using the first reflecting surface 155a and the second reflecting surface 155b can be improved.

In particular, on the radiation side of the first illumination unit 121a and the second illumination unit 121b, a louver 140 in which each blade plate 141 is arranged in parallel with the reading surface 114 is provided. As a result, the light emitted through the louver 140 is less likely to be emitted to the outside directly through the reading surface 114, so even if the display surface is held so as to be inclined with respect to the reading surface 114, specular reflection is likely to be suppressed, and a configuration capable of allowing a rough display surface or the like to be held can be realized. The louver 140 is not limited to being arranged so that each wing plate 141 is parallel to the reading surface 114. Each wing plate 141 may be arranged substantially parallel to the reading surface 114, that is, each wing plate 141 may be arranged along a plane parallel to the reading surface 114.

The louver 140 may be abolished in order to further improve the noise light suppression effect using the first reflecting surface 155a and the second reflecting surface 155b. Also, the characteristic configuration of this embodiment can be applied to other embodiments and the like.

Sixth Embodiment

Then, the information code reading apparatus according to the sixth embodiment will be described with reference to the drawings.

The sixth embodiment is mainly different from the fifth embodiment in that the louver 140 is abolished and the illumination light is radiated in a plurality of directions according to the shape of the light guide plate of the surface light source.

Figure 20:
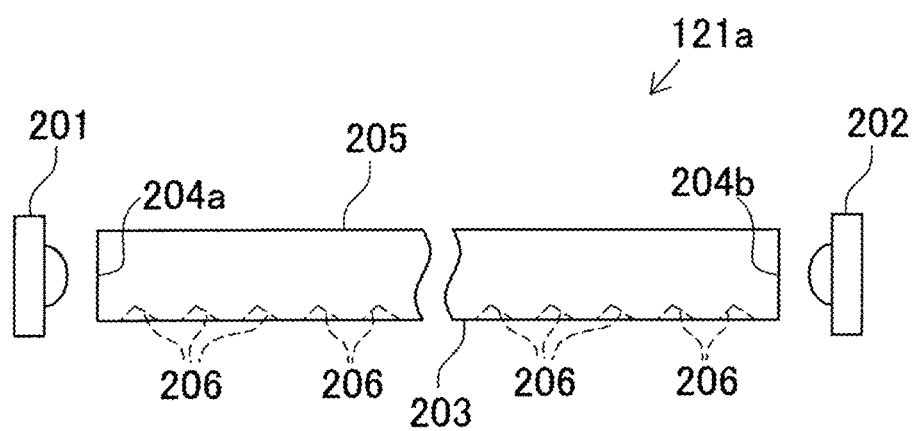
FIG. 20 is an explanatory diagram illustrating a main part of the information code reader according to the sixth embodiment In FIG. 21, a part (A) is an explanatory view illustrating an radiation direction in which light from the first side surface side is emitted as illumination light, and a part (B) is an explanatory diagram illustrating an radiation direction in which light from the second side surface side is emitted as illumination light.

In this embodiment, as shown in FIG. 20, the first illumination unit 121a that functions as a surface light source is located between the first light emitting unit 201 and the second light emitting unit 202 that emit visible light as illumination light, and between the first light emitting unit 201 and the second light emitting unit 202, and it is provided with a light guide plate 203 in which the light from the first light emitting unit 201 is incident on the first side surface 204a and the light from the second light emitting unit 202 is incident on the second side surface 204b. The light guide plate 203 has a plurality of grooves 206 inside which the light incident from the first side surface 204a and the second side surface 204b is reflected toward the exit surface 205. The plurality of grooves 206 are asymmetrically formed so that the shape of the first side surface 206a on the first side surface 204a side and the shape of the second side surface 206b on the second side surface 204b side are different.

Specifically, since the groove 206 is formed so that the first side surface 206a has a curved surface portion having a large curvature, as illustrated in FIG. 21, (A), the light from the first side surface 204a side is emitted from the exit surface 205 according to the direction of passing through the first side surface 206a and the second side surface 206b. Further, since the second side surface 206b is formed so as to have a flat surface portion or a curved surface portion having a small curvature close to a flat surface, as illustrated in FIG. 21, (B), the light from the second side surface 204*b* side is emitted from the exit surface 205 according to the direction in which the light is reflected by the second side surface 206*b*.

That is, the radiation direction of visible light (illumination light) emitted from the radiation surface is divided into at least two directions, an radiation direction due to the shape of the first side surface 206*a* and an radiation direction due to the shape of the second side surface 206*b*. As a result, By forming the first side surface 206*a* and the second side surface 206*b* of each groove 206 is directed so that one radiation direction is directed to the first reflecting surface 55*a* and the second reflecting surface 55*b*, and the other radiation direction is directed to a predetermined range such as insufficient illuminance on the reading surface 114, it is possible to increase the illuminance on the side 114*a* side of the reading surface 114 close to the first illumination unit 121*a*, and to compensate for the decrease in the amount of peripheral light of the first imaging unit 127*a*.

In this way, as compared with the case where the shape of the surface of the plurality of grooves 206 on the first side surface 204*a* side and the shape of the surface on the second side surface 204*b* side are symmetrically formed, the illuminance distribution of visible light (illumination light) emitted from the exit surface tends to vary. That is, by changing the shape of the plurality of grooves 206 according to the desired illuminance distribution of visible light, Not only can visible light be emitted in multiple directions through the exit surface but also a part of the visible light is radiated toward the first reflecting surface 55*a* and the second reflecting surface 55*b*, and the radiation direction can be controlled by radiating the other part of the visible light toward the end side of the reading surface 114 such that the peripheral light amount of the first imaging unit 127*a* is reduced.

Figure 22:
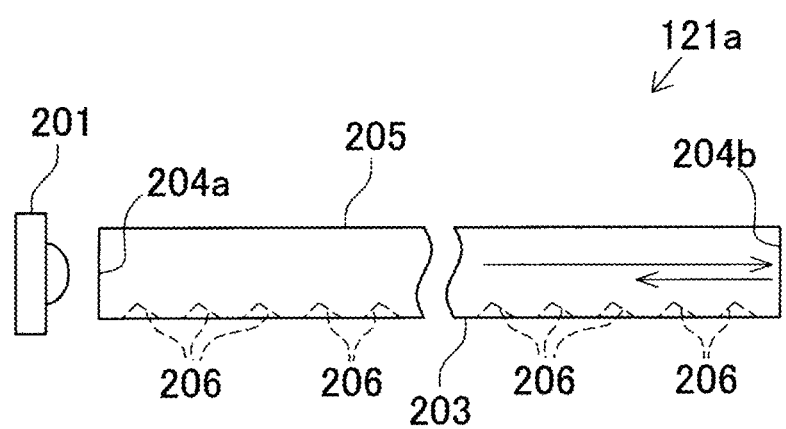
FIG. 22 is an explanatory diagram illustrating a main part of an information code reader according to a first modification of the sixth embodiment.

As a first modification of the present embodiment, as illustrated in FIG. 22, the second light emitting unit 202 may be abolished. That is, in the modified example of this embodiment, the first illumination unit 121*a* is configured to include a first light emitting unit 201 and a light guide plate 203 on which light from the first light emitting unit 201 is incident on the first side surface 204*a*.

Even in this way, Since the light incident from the first side surface 204*a* is internally reflected by the second side surface 204*b* toward the first side surface 204*a*, the illuminance distribution of the visible light (illumination light) emitted from the exit surface is likely to vary. As a result, by changing the shape of the plurality of grooves 206 according to the desired illuminance distribution of visible light, it is possible not only to radiate visible light in a plurality of directions through the exit surface, but also to control the radiation direction. In particular, since the first light emitting unit 201 may be arranged on the first side surface 204*a* side, It is not necessary to arrange the second light emitting unit 202 on the side of the second side surface 204*b*, and it is possible to save space and reduce the number of parts of the first lighting unit 121*a*.

Figure 23:
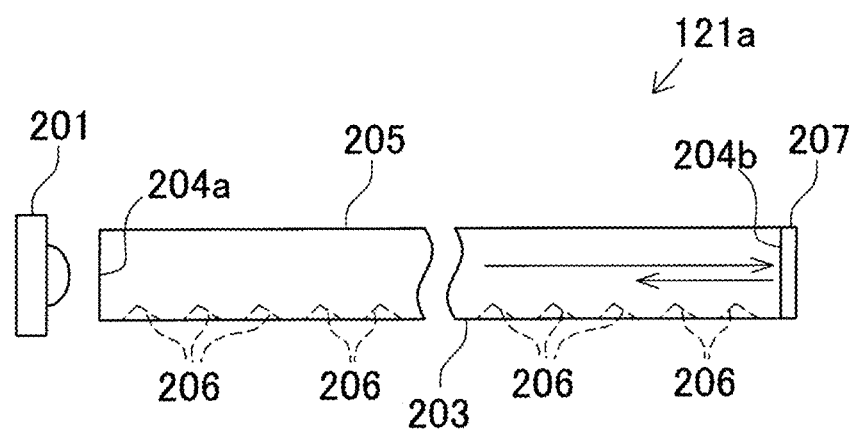
FIG. 23 is an explanatory diagram illustrating a main part of an information code reader according to a second modification of the sixth embodiment.

Further, as a second modification of the present embodiment, as illustrated in FIG. 23, a reflector 207 may be provided on the second side surface 204*b* in which the second light emitting unit 202 is abolished. As a result, the light incident from the first side surface 204*a* is easily internally reflected by the second side surface 204*b* toward the first side surface 204*a*, so that the reflection efficiency is increased. Since the reflective material 207 is not provided, it is possible to prevent a part of the light incident from the first side surface 204*a* from passing through the second side surface 204*b*, it is possible to increase the illuminance of visible light (illumination light) emitted in a plurality of directions through the exit surface.

In the first modification, the first light emitting unit 201 may be abolished instead of the second light emitting unit 202. Further, in the second modification, the first light emitting unit 201 may be abolished instead of the second light emitting unit 202, and the reflective material 207 may be provided on the first side surface 204*a*. Therefore, the first illumination unit 121*a* includes a light emitting unit and a light guide plate 203 on which light from the light emitting unit is incident on one side surface, and the light guide plate 203 has a plurality of grooves 206 inside which light incident from one side surface is reflected toward the exit surface 205. When the surface of each side surface of the light guide plate 203 facing the one side surface is the other side surface, it may be formed asymmetrically so that the shape of the surface on the one side surface side and the shape of the surface on the other side surface side are different.

The characteristic configurations of the present embodiment and modifications that radiate illumination light in a plurality of directions according to the shape of the light guide plate of a surface light source can be applied to the second illumination unit 121*b* that functions as the surface light source.

Seventh Embodiment

Next, the information code reader according to the seventh embodiment will be described with reference to the drawings.

The seventh embodiment is mainly different from the fifth embodiment in that the reflection state of a part of the reflection member is changed in order to reduce the influence of specular reflection.

Figure 24:
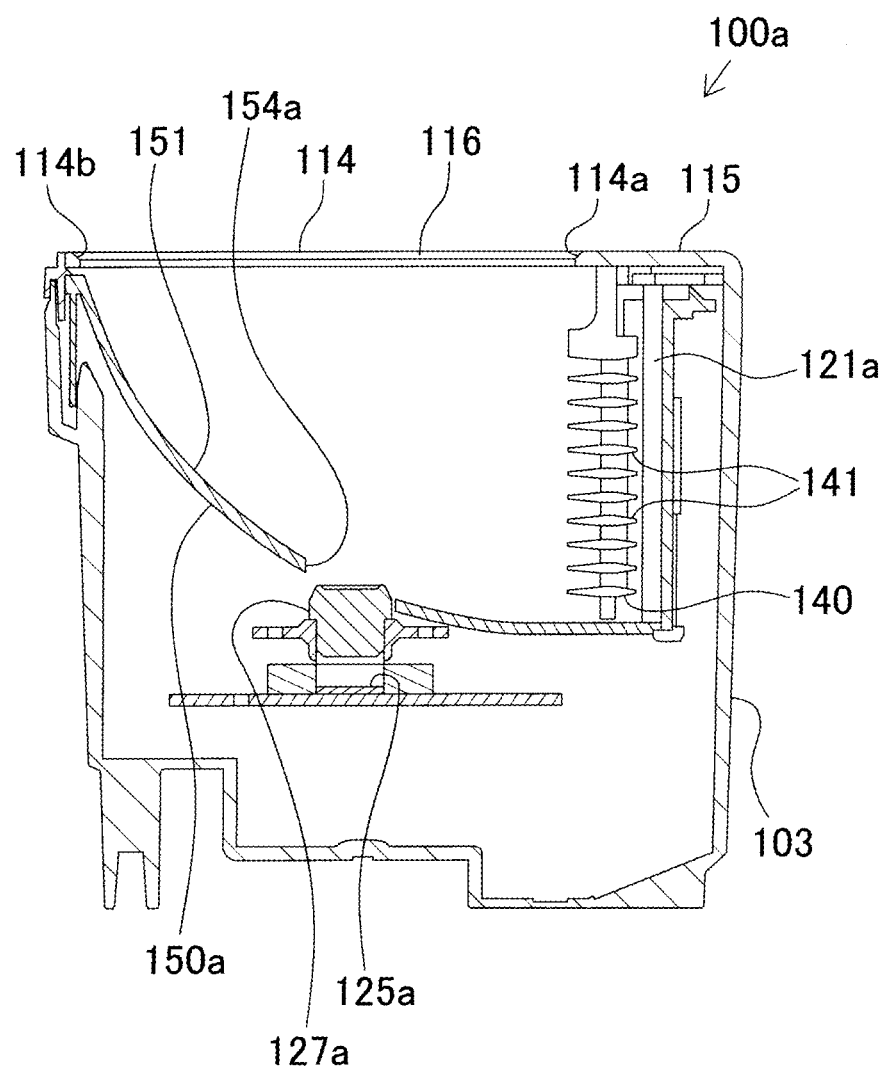
FIG. 24 is a schematic cross-sectional view showing a main part of the information code reader according to the seventh embodiment.
Figure 25:
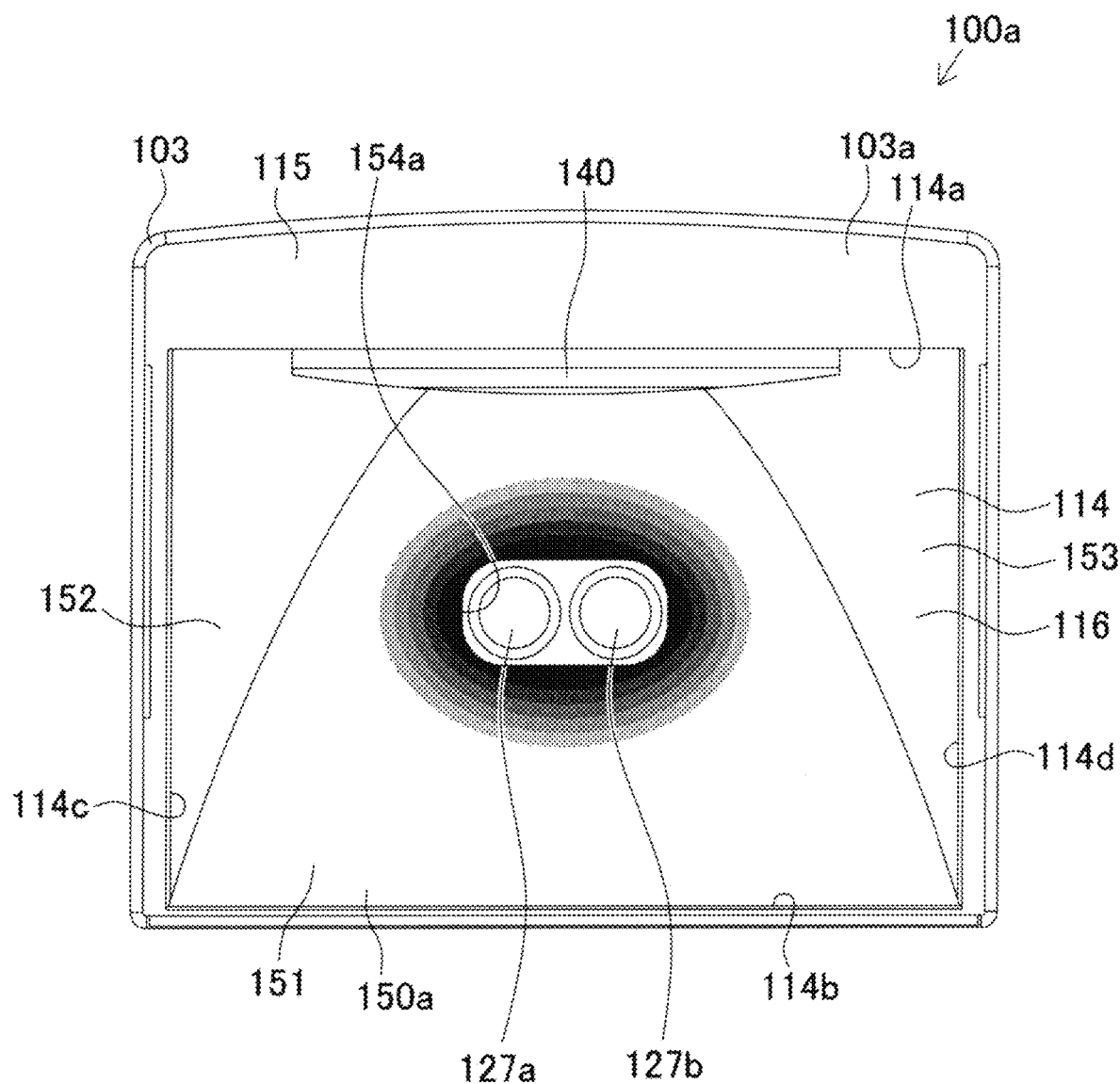
FIG. 25 is a plan view of the information code reader of FIG. 24.

The information code reader 100*a* according to the present embodiment is significantly different from the above-mentioned information code reader 100 in that a reflecting member 150*a* is used instead of the reflecting member 150. The reflective member 150*a* has substantially the same curved surface shape as the reflective member 150, and as shown in FIGS. 24 and 25, an opening 154*a* is provided at a position substantially central to the reading surface 114 side (upper side). The light receiving optical system is arranged so that the first imaging unit 127*a* and the second imaging unit 127*b* are exposed as exposed portions through the opening 154*a*.

In particular, in the present embodiment, as can be seen from FIG. 25, the annular edge forming the opening 154*a* (hereinafter, also simply referred to as the opening edge) is formed so that light reflection states gradually change brightly from the inside to the outside thereof.

The reason for forming the opening edge portion of the opening 154*a* in this way will be described below.

For example, when the information code of the display screen held over the reading surface 114 is imaged, the reflective member 150*a* or the like inside the case 103 may be reflected in the acquired image by specular reflection via the transparent protective plate 116 (reading surface 114). In such a case, there is a possibility that the decoding of the captured information code may fail depending on the states of the light reflection. As described above, when the first imaging unit 127*a* and the second imaging unit 127*b* are exposed in the reflecting surface of the reflecting member 150*a* that reflects the illumination light toward the reading surface 114, the boundary portion between the exposed portion and the reflecting portion around the exposed portion is a range in which the contrast suddenly changes in the reflected acquired image since the exposed portion does not have the reflection characteristic. Specifically, since the exposed portion is imaged in black and the reflected portion around the exposed portion is imaged in white, the boundary portion between the two is a range in which the contrast suddenly changes between black and white. In the acquired image to be decoded, when the range in which the contrast suddenly changes as described above overlaps with a part of the code region formed by arranging the light-colored cells and the dark-colored cells of the information code, this is because the accuracy of determining the brightness of the cell is lowered in the overlapping range, so that the success rate of decoding the information code is lowered.

Therefore, in the present embodiment, in order to suppress a decrease in the decoding success rate of the information code due to specular reflection, the opening edge portion of the opening 154a is formed so that the light reflection states gradually changes brightly from the inside to the outside. Here, as a configuration for realizing the above-mentioned change in the light reflection states, for example, a color scheme is adopted in which the color of the opening edge itself of the reflection member 150a gradually changes from black to bright white from the inside to the outside.

With this configuration, the reflective portion corresponding to the opening edge portion becomes a range in which the contrast gradually changes in the acquired image reflected as described above (hereinafter, also referred to as a gradual change range). As a result, even when the gradual change range of the acquired image overlaps a part of the code region formed by arranging the light-colored cells and the dark-colored cells of the information code, it is possible to suppress the decrease in the decoding success rate of the information code due to specular reflection since the accuracy of the brightness determination of the cell is less likely to decrease.

It should be noted that the configuration for realizing the change in the light reflection states described above is not limited to adopting a configuration in which the color of the opening edge itself of the reflection member 150a is changed. For example, a configuration utilizing the reflectance adjusted by surface processing or the like on the opening edge portion of the reflective member 150a may be adopted. Further, a covering member (for example, a sealing member) for covering the opening edge portion may be separately prepared, and the covering member may be formed so that its light reflection states gradually change brightly from the inside to the outside. Even in this way, in the acquired image reflected as described above, the covering member located around the exposed portion (first imaging unit 127a and second imaging unit 127b) is within the gradual change range as described above, so that it is possible to suppress a decrease in the success rate of decoding the information code due to specular reflection. In particular, the contrast in the gradual change range in the acquired image can be easily adjusted by replacing the covering member.

Further, the gradual change range is not limited to being provided at the opening edge of the opening 154a where the first imaging unit 127a and the second imaging unit 127b are exposed as exposed portions, and it may be provided at the opening edge of the opening that exposes other exposed portions such as screws provided in the reflective surface of the reflective member 150a. Also, the gradual change range is provided at the opening edge of the opening that exposes a part of the image acquisition unit such as the imaging unit as an exposed portion even if one imaging unit is adopted instead of the two imaging units. Even in this way, the above-mentioned effect is obtained with respect to the other exposed parts and the like. Further, when a plurality of exposed portions are provided for the reflective member, the gradual change range may be provided for each exposed portion.

Further, the gradual change range is not limited to being provided in an annular shape with respect to the opening edge portion forming the opening 154a, and may be provided at least in a part of the opening edge portion.

Further, the opening for exposing the exposed portion is not limited to being provided substantially in the center of the reflecting member when viewed from the reading surface side, and may be provided in a notch shape with respect to the outer edge of the reflecting surface.

Figure 26:
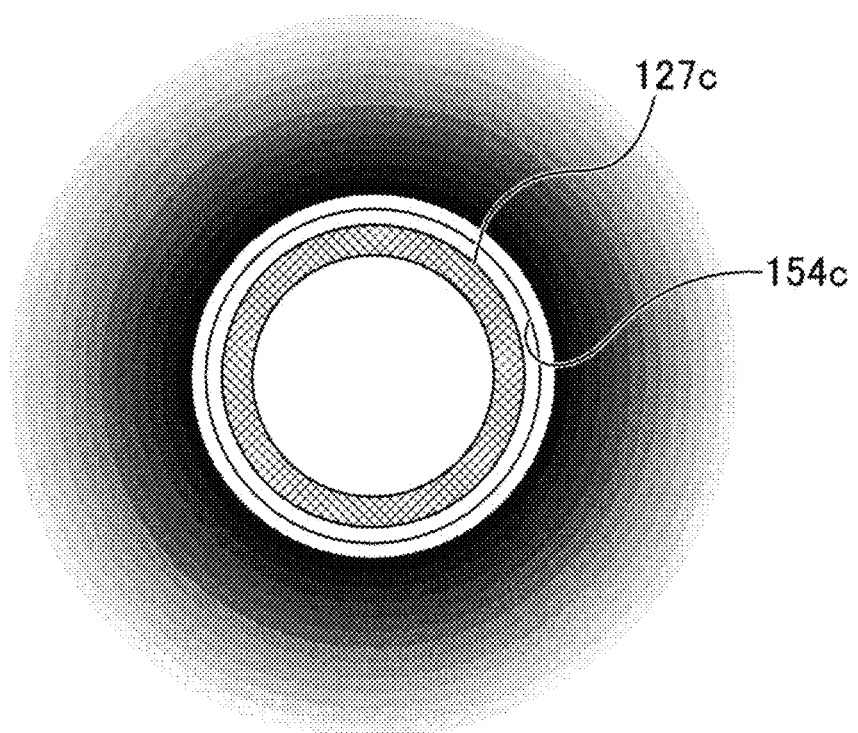
FIG. 26 is an enlarged view showing an enlarged main part of an information code reader according to a modified example of the seventh embodiment.

As a modification of the present embodiment, the peripheral edge of the exposed portion, which is the outer annular edge when viewed from the reading surface side, may be formed so that the light reflection states gradually change brightly from the inside to the outside. If the configuration is such that the two first imaging units 127a and the second imaging unit 127b are exposed as described above, the peripheral edge portions of the outer annular edges of the first imaging unit 127a and the second imaging unit 127b viewed from the reading surface side are formed so that the light reflection states gradually change brightly from the inside to the outside. Further, for example, as illustrated in FIG. 26, if one imaging portion 127c is exposed as an exposed portion from the opening 154c, a peripheral edge portion (see the cross-hatched region in FIG. 26), which is an outer annular edge of the image forming portion 127c, is formed so that the light reflection states gradually change brightly from the inside to the outside. As a result, the gradual change range is widened so as to include not only the opening edge portion of the opening 154c provided in the reflective member 150a but also the peripheral edge portion of the exposed portion. Since the degree of change in brightness in the gradual change range can be reduced, it is possible to further suppress a decrease in the decoding success rate of the information code due to specular reflection.

The gradual change range is not limited to being provided on both the opening edge portion of the opening of the reflective member and the peripheral edge portion of the exposed portion, and may be provided only on the peripheral edge portion of the exposed portion. That is, the exposed portion is exposed through the opening provided in the reflective member when viewed from the reading surface side, and the exposed portion is formed so that the peripheral portion, which is the outer annular edge when viewed from the reading surface side, gradually changes its light reflective states brightly from the inside to the outside.

Even in this way, the peripheral portion becomes a gradual change range in which the contrast gradually changes brightly in the acquired image reflected as described above, and even when the gradual change range overlaps a part of the code area formed by arranging the light-colored cells and the dark-colored cells of the information code, the accuracy of the light-dark determination of the cells is unlikely to decrease. Therefore, it is possible to suppress a decrease in the success rate of decoding the information code due to specular reflection.

Eighth Embodiment

Next, the information code reader according to the eighth embodiment will be described with reference to the drawings.

In the eighth embodiment, the number of light receiving sensors and the like constituting the first image acquisition unit and the second image acquisition unit is mainly different from that of the first embodiment. Therefore, substantially the same components as those in the first embodiment are designated by the same reference numerals, and the description thereof will be omitted.

Figure 27:
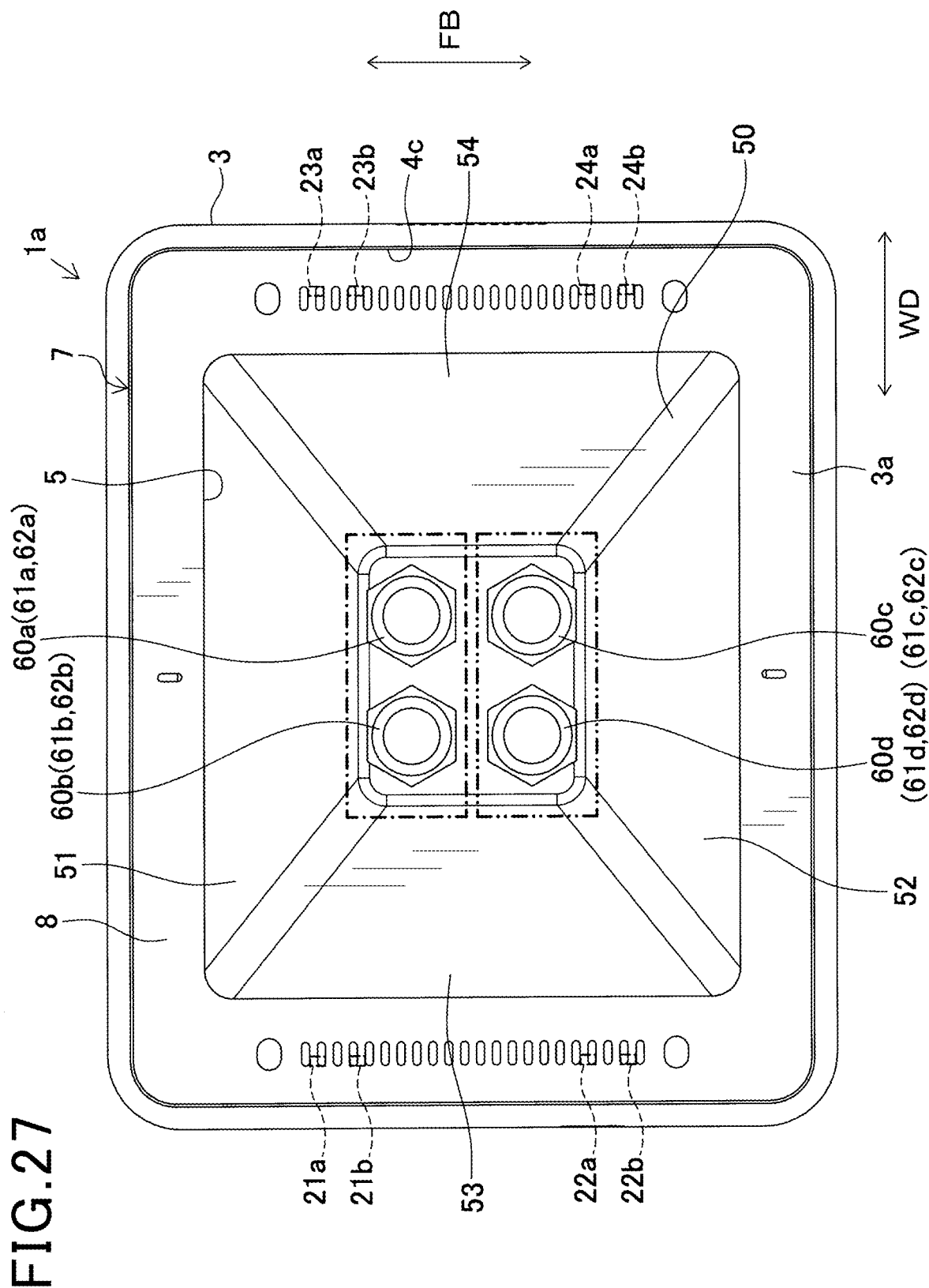
FIG. 27 is a plan view of the information code reader according to the eighth embodiment.

The information code reader 1a according to the present embodiment is configured such that the number of light receiving sensors and the like constituting the first image acquisition unit and the second image acquisition unit is different from that of the information code reader 1 described above. Specifically, as shown in FIG. 27, the first image acquisition unit unit 25a is configured to include a light receiving sensor 61a and a light receiving sensor 61b. The first imaging unit 27a is configured to include an imaging lens 62a that forms an image of an information code or the like on the light receiving sensor 61a and an imaging lens 62b that forms an image of an information code or the like on the light receiving sensor 61b. The above-mentioned visible light cut filter 29 is not arranged between the light receiving surface of the light receiving sensor 61a and the imaging lens 62a and between the light receiving surface of the light receiving sensor 61b and the imaging lens 62b.

In particular, the imaging lens 62a is configured so that the focus position is set near the reading surface 7a, and unlike the imaging lens 62a, the imaging lens 62b is configured so that the focus position is set at a position farther than the reading surface 7a (for example, a position corresponding to about twice the distance to the reading surface 7a).

Therefore, regarding the imaging of the information code Cb or the like displayed on the screen, two types of first acquired images are captured by a light receiving optical system 60a for visible light including a light receiving sensor 61a and an imaging lens 62a and a light receiving optical system 60b for visible light including a light receiving sensor 61b and an imaging lens 62b. That is, by making the functions related to imaging different between the light receiving optical system 60a for visible light and the light receiving optical system 60b for imaging the information code Cb or the like displayed on the screen as described above, it is possible to capture an acquired image in which the focus is on the vicinity of the reading surface 7a and an acquired image in which the focus is on a position farther than the reading surface 7a. The light receiving sensor 61a can correspond to an example of "one light receiving sensor", and the light receiving optical system 60a can correspond to an example of "one light receiving optical system". Also, the light receiving sensor 61b may correspond to an example of the "other light receiving sensor", and the light receiving optical system 60b may correspond to an example of the "other light receiving optical system".

Further, the second image acquisition unit 25b is configured to include a light receiving sensor 61c and a light receiving sensor 61d, and the second imaging unit 27b is configured to include an imaging lens 62c that forms an image of an information code or the like on the light receiving sensor 61c and an imaging lens 62d that forms an image of an information code or the like on the light receiving sensor 61d. The above-mentioned visible light cut filter 29 is arranged between the light receiving surface of the light receiving sensor 61c and the imaging lens 62c and between the light receiving surface of the light receiving sensor 61d and the imaging lens 62d.

In particular, the imaging lens 62c is configured so that the focus position is set near the reading surface 7a, and unlike the imaging lens 62c, the imaging lens 62d is configured so that the focus position is set at a position farther than the reading surface 7a (for example, a position corresponding to about twice the distance to the reading surface 7a).

For this reason, regarding the imaging of the information code Ca or the like whose security is enhanced by the covering portion Ca2, two types of second acquired images are provided by a light receiving optical system 60c for infrared light including a light receiving sensor 61c and an imaging lens 62c and a light receiving optical system 60d for infrared light including a light receiving sensor 61d and an imaging lens 62d. That is, the functions related to imaging are different between the light receiving optical system 60c for infrared light and the light receiving optical system 60d for imaging the information code Ca or the like whose security is enhanced by the covering portion Ca2. The light receiving sensor 61c may correspond to an example of "one light receiving sensor", and the light receiving optical system 60c may correspond to an example of "one light receiving optical system". Further, the light receiving sensor 61d may correspond to an example of the "other light receiving sensor", and the light receiving optical system 60d may correspond to an example of the "other light receiving optical system".

In the reading process performed by the control unit 31 (that is, the CPU 31A) in the information code reader 1a configured in this way, visible light is emitted from the first lighting units 21a to 24a. Also, in a state where infrared light is radiated from the second illumination units 21b to 24b (S101), a process for capturing the first acquired image is performed from each of the light receiving sensor 61a and the light receiving sensor 61b. At the same time, a process for capturing a second acquired image is performed from each of the light receiving sensor 61c and the light receiving sensor 61d (S103).

At that time, when the information code Cb displayed on the screen is imaged, the light receiving sensor 61a and the light receiving sensor 61b capture the first acquired image as shown in FIG. 7, (A). In particular, in the light receiving optical system 60a having the light receiving sensor 61a, it is possible to focus on the information code Cb held near the reading surface 7a, and in the light receiving optical system 60b having the light receiving sensor 61b, the information code Cb separated from the reading surface 7a to some extent can be focused. Since two types of first acquired images can be captured so that the focus is different in this way, it is possible to increase the reading success rate of the information code Cb or the like displayed on the screen.

On the other hand, when the above-mentioned information code Ca is imaged, the light receiving sensor 61c and the light receiving sensor 61d capture a second acquired image as shown in FIG. 6, (B). In particular, in the light receiving optical system 60c having the light receiving sensor 61c, it is possible to focus on the information code Ca held near the reading surface 7a, and in the light receiving optical system 60d having the light receiving sensor 61d, it is possible to focus on the information code Ca displayed on the screen at a certain distance from the reading surface 7a. Since the two types of second acquired images can be captured so that the focus is different in this way, it is possible to increase the reading success rate of the information code Ca or the like whose security is enhanced by the covering portion Cat.

As described above, in the information code reader 1a according to the present embodiment, the first image acquisition unit 25a includes a light receiving sensor 61a and a light receiving sensor 61b, and the light receiving optical system 60a having the light receiving sensor 61a is configured so that the function related to imaging is different from that of the other light receiving optical system 60b having the light receiving sensor 61b. As a result, even if it is a normal information code displayed on a liquid crystal screen or the like, two types of acquired images are captured by the light receiving optical system 60a and the light receiving optical system 60b according to the above different functions. Therefore, When the information code cannot be decipherably imaged by the light receiving optical system 60a and the information code can be decipherably imaged by the light receiving optical system 60b, or even if the light receiving optical system 60b cannot decipherably image the information code, the light receiving optical system 60a may be able to decipherably image the information code, so that the decoding success rate of the information code can be increased.

Further, the second image acquisition unit 25b includes a light receiving sensor 61c and a light receiving sensor 61d, and the light receiving optical system 60c having the light receiving sensor 61c is configured so that the function related to imaging is different from that of the light receiving optical system 60d having the light receiving sensor 61d. As a result, even if the code region C1a is covered with the coating portion Ca that transmits light in the second wavelength band such as infrared light without transmitting visible light, according to the different functions, two types of acquired images can be captured by the image captured by the light receiving optical system 60c and the image captured by the light receiving optical system 60d. Therefore, when the information code Ca cannot be decipherably imaged by the light receiving optical system 60c and the information code Ca can be decipherably imaged by the light receiving optical system 60d, or even if the light receiving optical system 60d cannot decipherably image the information code Ca, the light receiving optical system 60c may be able to decipherably image the information code Ca, so that the success rate of decoding the information code can be increased.

Figure 28:
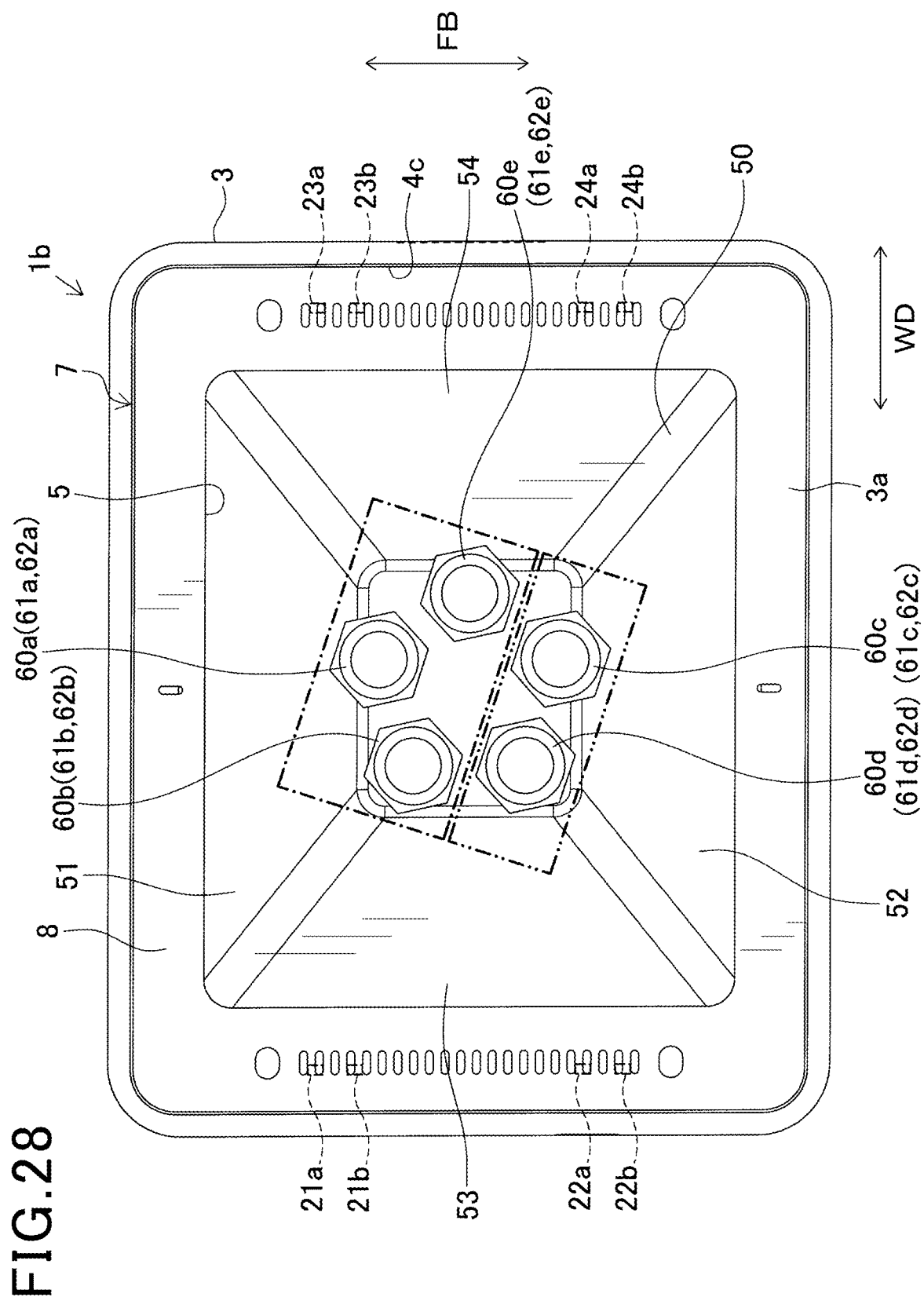
FIG. 28 is a plan view of an information code reader according to a first modification of the eighth embodiment.

The light receiving optical system for visible light is not limited to two, the light receiving optical system 60a and the light receiving optical system 60b, and three or more may be prepared. For example, as a first modification of the present embodiment, as in the information code reader 1b shown in FIG. 28, in addition to the light receiving optical system 60a and the light receiving optical system 60b, three light receiving optical systems 60e for visible light may be prepared for the information code reader 1a. Similarly, the light receiving optical system for infrared light is not limited to the two light receiving optical systems 60c and the light receiving optical system 60d, and three or more light receiving optical systems may be prepared.

Further, while two or more light receiving optical systems for visible light may be prepared, one light receiving optical system for infrared light may be prepared. For example, as a second modification of the present embodiment, as in the information code reader 1c shown in FIG. 29, the light receiving optical system 60a, the light receiving optical system 60b, and the light receiving optical system 60c may be prepared for the information code reader 1a. Similarly, while two or more light receiving optical systems for infrared light may be prepared, one light receiving optical system for visible light may be prepared.

In addition, in a plurality of light receiving optical systems for visible light, the function related to imaging in which one light receiving optical system is different from the other light receiving optical system is not limited to the function corresponding to the above-mentioned adjustment of the focus position, and may be, for example, a function corresponding to the adjustment of the viewing angle.

For example, by making the viewing angle of the light receiving optical system 60a smaller than the viewing angle of the light receiving optical system 60b and making the functions related to imaging different. in the light receiving optical system 60b, the entire surface of the reading surface 7a is a region where the information code can be imaged, and in the light receiving optical system 60a, the imaging field of view is narrowed, but even a small cell information code can be decipherably imaged.

Further, for example, the number of pixels of one light receiving sensor in one light receiving optical system may be larger than the number of pixels of the other light receiving sensor in the other light receiving optical system so that the functions related to imaging may be different. In this case, even with the light receiving optical system having a wide viewing angle, it is possible to decipherably capture a small information code of the cell. Further, since the load related to image processing is reduced in the other light receiving optical system having a small number of pixels, the reading speed can be improved when the information code can be imaged decipherably by the other light receiving optical system having a small number of pixels.

Further, in the light receiving optical systems for a plurality of infrared lights, as described above, the functions related to imaging in which one light receiving optical system is different from the other light receiving optical system may be a function corresponding to the adjustment of the viewing angle or a function corresponding to the number of pixels.

Further, in a plurality of light receiving optical systems for visible light, by adopting a color sensor as at least one light receiving sensor, an information code (color code) whose recording amount is increased by using color information may be readable. Similarly, in a plurality of light receiving optical systems for infrared light, a color code may be readable by adopting a color sensor as at least one light receiving sensor. Further, the characteristic configurations of the present embodiment and the modified examples can be applied to other embodiments and the like.

The present invention is not limited to each of the above embodiments, and may be embodied as follows.

(1) In the reading process performed by the control unit 31, the acquired image to be decoded is not limited to being set according to the number of extracted position detection patterns and the number of black and white changes in a specific area. One of the first acquired image and the second acquired image is set as an easily decipherable target based on the result of analysis processing for at least a part of the first acquired image and the second acquired image. Similarly in this way, the processing load related to the decoding process can be reduced. Also, in the reading process performed by the control unit 31, without setting either one of the first acquired image and the second acquired image as the acquired image to be decoded, the information code decoding process based on the first acquired image and the information code decoding process based on the second acquired image may be performed, respectively.

(2) The control unit 31 sets the acquired image to be decoded from the first acquired image and the second acquired image according to the number of extracted position detection patterns, the number of black-and-white changes in a specific area, and the like by an FPGA (Field Programmable Gate Array) separately provided for a CPU. Such a CPU may be configured to perform decoding processing of the information code based on the acquired image to be decoded.

(3) The information code Ca whose security is enhanced by using the covering portion Ca2 is not limited to the configuration in which the entire code region Ca1 is covered by the covering portion Ca2, and a part of the coding region Ca1 may be configured to be covered with the covering portion Ca2.

(4) The illumination light emitted by the second illumination units 21b to 24b, 121b is not limited to infrared light, and may be light in a predetermined second wavelength band different from the wavelength band of visible light. In this configuration, the visible light cut filter 29 is configured to transmit light in the predetermined second wavelength band without transmitting visible light. Further, in the third embodiment, instead of the infrared light cut filter 29a, another filter configured to transmit visible light without transmitting light in the predetermined second wavelength band is adopted.

(5) The present invention is not limited to being applied to a stationary information code reader, and may be applied to a portable information code reader.

REFERENCE SIGNS LIST 1,1a~1c,100,100a . . . information code reader
3,103 . . . case
5 . . . reading port
21a~24a,121a . . . first lighting unit
21b~24b,121b . . . second lighting unit
25a,125a . . . first image acquisition unit
25b,125b . . . second imaging acquisition unit
27a,127a . . . first image acquisition unit (exposed portion)
27b,127b . . . second image acquisition unit (exposed portion)
127c . . . imaging unit (exposed portion)
29,129 . . . visible light cut filter (filter)
29a . . . infrared light cut filter (other filter)
31 . . . control unit (processing unit, illumination control unit, setting unit)
31A . . . CPU
60a~60e . . . light receiving optical system
61a~61e . . . light receiving sensors
62a~62e . . . imaging lens
150,150a . . . reflecting member
154,154a,154c . . . opening
AR1a . . . first pre-reflection imaging range
AR1b . . . first post-reflection imaging range
AR2a . . . second pre-reflection imaging range
AR2b . . . second post-reflection imaging range
Ca,Cb . . . information code
Ca1 . . . code region
Ca2 . . . covering member
FPa,FPb . . . position detection pattern (specific pattern)
Lfa . . . visible light
Lfb . . . infrared light (predetermined second wavelength band light)
S . . . specific area

What is claimed is:

1. An information code reader comprising:
a first illumination unit configured to radiate visible light having a visible light wavelength band;
a second illumination unit configured to radiate light in a predetermined second wavelength band different from the visible light wavelength band;
a first image acquisition unit configured to capture an information code in a state where the visible light is radiated by the first illumination unit, the information code having a code region in which a predetermined number of specific patterns are arranged;
a second image acquisition unit configured to acquire an information code while the second illumination unit radiates light in the second wavelength band;
a filter configured to be arranged according to an imaging range of the second image acquisition unit, the filter being configured to transmit light in the second wavelength band without transmitting visible light; and
a processor that performs a process of:
decoding an information code based on at least one of a first image acquired by the first image acquisition unit and a second image acquired by the second image acquisition unit, and
setting, as an object to be decoded by the processor, either the first acquired image or the second acquired image, based on a result of an analyzation process applied to at least a part of the first acquired image and the second acquired image, the analyzation process including:
extracting the specific patterns from each of the first acquired image and the second acquired image, and
setting, as the object to be decoded, one acquired image of the first acquired image or the second acquired image, the one acquired image having a number of extracted specific patterns that is larger than the number of extracted specific patterns in an another acquired image of the first acquired image or the second acquired image, wherein
the processor processes the information code based on the one acquired image set as the object.

2. The information code reader of claim 1, wherein the processor further performs a process of controlling the first illumination unit such that the first illumination unit radiates the visible light during image acquisition performed by the first image acquisition unit and controlling the second illumination unit such that the second illumination unit radiates the light of the second wavelength band during image acquisition performed by the second image acquisition unit.

3. An information code reader comprising:
a first illumination unit configured to radiate visible light having a visible light wavelength band;
a second illumination unit configured to radiate light in a predetermined second wavelength band different from the visible light wavelength band;
a first image acquisition unit that captures an information code in a state where the visible light is radiated by the first illumination unit,
a second image acquisition unit configured to acquire an information code while the second illumination unit radiates light in the second wavelength band;
a filter configured to be arranged according to an imaging range of the second image acquisition unit, the filter being configured to transmit light in the second wavelength band without transmitting visible light; and a processor that performs a process of:
decoding an information code based on at least one of a first image acquired by the first image acquisition unit and a second image acquired by the second image acquisition unit,
setting, as an object to be decoded by the processor, either the first acquired image or the second acquired image, based on a result of an analyzation process applied to at least a part of the first acquired image and the second acquired image, the analyzation process including:
performing binarization on specific areas in the first acquired image and the second acquired image,
performing a process of counting a number of changes to black or white along one or more scanning lines in the specific areas, and
setting, as the object to be decoded, one acquired image of the first acquired image or second acquired image, the one acquired image having a larger number of the changes than another acquired image of the first acquired image or the second acquired image, wherein
the processor processes the information code based on the one acquired image set as the object.

4. The information code reader of claim 3, further comprising a further filter configured to be arranged according to an imaging range of the first image acquisition unit and transmits the visible light without transmitting the light in the second wavelength band.

5. The information code reader of claim 3, wherein
the first and second image acquisition units are arranged in a case with a reading surface such that a center of a field of view of the first image acquisition unit and a center of a field of view of the second image acquisition unit are at a center of the reading surface, the information code being configured to be held on or over the reading surface being imaged.

6. The information code reader of claim 3, further comprising:
a case configured to contain at least the first and second illumination units, the first and second image acquisition units, the filter, and a reading surface; and
a reflecting member configured to be contained in the case and configured to reflect the visible light radiated by the first illumination unit and the light of the second wavelength band radiated by the second illumination unit towards the reading surface.

7. The information code reader of claim 6, wherein:
when i) the imaging range of the first image acquisition unit includes a first pre-reflection imaging range and a first post-reflection imaging range, the first pre-reflection imaging range being a spatial range formed between a first imaging unit of the first image acquisition unit and the reading surface, the post-refection imaging range being a spatial range formed between the reading surface and the reflecting member and the post-reflection imaging range is formed to continue from the first pre-reflection imaging range when the light is reflected inward by the reading surface in the case, and ii) the imaging range of the second image acquisition unit includes a second pre-reflection imaging range and a second post-reflection imaging range, the second pre-reflection imaging range being a spatial range formed between a second imaging unit of the second image acquisition unit and the reading surface and, the post-reflection imaging range being a spatial range formed between the reading surface and the reflecting member and the post-refection imaging range is formed to continue from the second pre-reflection imaging range when the light is reflected inward from the reading surface in the case,
the reflecting member is arranged, in the case, at a position which is outside both the first pre-reflection imagine range and second pre-reflection imaging range,
the first and second illumination units, the first and second image acquisition ranges, and the filer are arranged, in the case, at positions which are outside both the first post-refection imaging range and the second post-reflection imaging range,
the first illumination unit is configured to radiate the visible light towards a first reflecting surface of the reflecting member, the first reflecting surface corresponding to the first post-reflection imaging range on the reflecting member, and
the second illumination unit is configured to radiate the light of the second wavelength band towards a second reflecting surface of the reflecting member, the second reflecting surface corresponding to the second post-reflection imaging range on the reflecting member.

8. The information code reader of claim 7, wherein
the first illumination unit is configured to radiate the visible light which is suppressed from varying in an illuminance distribution on the first reflecting surface, and
the second illumination unit is configured to radiate the light of the second wavelength band from varying in an illuminance distribution thereof on the first reflecting surface.

9. The information code reader of claim 7, wherein
the first illumination unit and the second illumination unit are provided, respectively, as a surface light source.

10. The information code reader of claim 9, wherein
the surface light source includes first light emitting members, second light emitting members, and a light guide plate arranged between the first and second light emitting members and the light guide plate formed to have a first side surface and a second side surface, light emitted from the first light emitting member coming onto the first side surface, the second side surface being opposed to the first side surface, light emitted from the second light emitting member coming onto the second side surface,
the light guide plate includes a plurality of grooves configured to enable the light from the first and second side surfaces to be reflected toward an exit surface of the light guide plate, and
the plurality of grooves each have sides closer to one of the first side surface and the second side surface, the respective sides of the plurality of grooves having shapes which are different from each other and asymmetrical from each other.

11. The information code reader of claim 9, wherein
the surface light source includes a light emitting member and a light guide plate having a one side on which the light from the light emitting member is reflected,
the light guide plate includes a plurality of grooves formed on the light guide plate, the light coming from the one side of the guide plate is reflected by the plurality of grooves towards an exit surface of the light guide plate,
the light guide plate has a plurality of sides including an other side opposed to the one side, and
the plurality of grooves each have sides closer to the one side and sides close to the other side, the respective sides of each of the plurality of grooves having shapes which are different from each other and asymmetrical from each other.

12. The information code reader of claim 7, wherein the first illumination unit and the second illumination unit each have a radiation side, a louver being arranged on the radiation side, the louver having a plurality of wing plates configure to be arranged to be parallel with the reading surface.

13. The information code reader of claim 6, wherein the reflecting member has an opening,
the information code reader includes an exposed portion which is exposed via the opening when being viewed from the reading surface, and
the opening is formed to include an edge, at least a part of the edge presenting light reflection states which change to be brighter gradually from an inside to an outside of the edge of the opening.

14. The information code reader of claim 13, wherein the exposed portion includes at least a part of the first image acquisition unit and second image acquisition unit.

15. The information code reader of claim 13, wherein the edge of the opening is accompanied by a covering member configured to cover at least a part of the edge, the covering member configured to present the light reflection states which are configured to change to be brighter gradually from the inside to the outside of the edge of the opening.

16. The information code reader of claim 6, wherein the reflecting member has an opening,
the information code reader includes an exposed portion which is configured to be exposed via the opening when being viewed from the reading surface, and
the exposed portion has an annular edge portion presenting an outer annular edge shape when being viewed from the reading surface, the annular edge portion configured to present light reflection states which change to be brighter gradually from the inside to the outside of the annual edge portion of the opening.

17. The information code reader of claim 3, wherein the first image acquisition unit includes two or more light receiving members, one of the two or more light receiving members being included in a first light receiving system and another one of the two or more light receiving members being included in a second light receiving system, the first light receiving system having different image acquisition functions from the second light receiving system.

18. The information code reader of claim 3, wherein the second image acquisition unit includes two or more light receiving members, one of the two or more light receiving members being included in a first light receiving system and another one of the two or more light receiving members being included in a second light receiving system, the first light receiving system having different image acquisition functions from the second light receiving system.

* * * * *